US007850518B2

(12) United States Patent
Walker et al.

(10) Patent No.: US 7,850,518 B2

(45) Date of Patent: Dec. 14, 2010

(54) VIDEO CONTENT DETERMINATIVE KENO GAME SYSTEM AND METHOD

(75) Inventors: Jay S. Walker, Ridgefield, CT (US); Russell P. Sammon, San Francisco, CA (US); Jeffrey Y. Hayashida, San Francisco, CA (US); Daniel E. Tedesco, Shelton, CT (US); Stephen C. Tulley, Monroe, CT (US)

(73) Assignee: Walker Digital, LLC, Stamford, CT (US)

(*) Notice: Subject to any disclaimer, the term of this patent is extended or adjusted under 35 U.S.C. 154(b) by 374 days.

(21) Appl. No.: 11/431,896

(22) Filed: May 10, 2006

(65) Prior Publication Data

US 2006/0287056 A1 Dec. 21, 2006

Related U.S. Application Data

(63) Continuation-in-part of application No. 11/160,410, filed on Jun. 22, 2005, now abandoned.

(60) Provisional application No. 60/582,377, filed on Jun. 23, 2004.

(51) Int. Cl.
*A63F 13/00* (2006.01)
*G07C 15/00* (2006.01)

(52) U.S. Cl. ............................ 463/17; 463/18; 463/19; 273/138.1; 273/139; 273/269; 379/93.13

(58) Field of Classification Search ............ 463/10–13, 463/17–19, 21–22, 29; 273/138.1, 139, 142 B, 273/142 A, 142 J, 269, 304; 379/93.13; *A63F 13/00, A63F 13/12; G07C 15/00*
See application file for complete search history.

(56) References Cited

U.S. PATENT DOCUMENTS

| | | | | |
|---|---|---|---|---|
| 4,582,324 | A | 4/1986 | Koza et al. | |
| 4,659,073 | A | 4/1987 | Leonard | 271/3 |
| 4,724,307 | A | 2/1988 | Dutton et al. | 235/455 |
| 5,110,129 | A | 5/1992 | Alvarez | |
| 5,192,076 | A | 3/1993 | Komori | 273/138 |

(Continued)

FOREIGN PATENT DOCUMENTS

WO WO 03/089081 4/2003

OTHER PUBLICATIONS

Keno Bonus Card, Massachusetts State Lottery.

(Continued)

*Primary Examiner*—David L Lewis
*Assistant Examiner*—Arthur O. Hall
(74) *Attorney, Agent, or Firm*—Fincham Downs LLC; Michael D. Downs

(57) ABSTRACT

A keno game is tied to video content such that events in the video content determine the outcome of the keno game. The outcome determinative events are selected from a set of potential outcome determinative events and marked with cues when the video content is displayed to the keno players and other video content watchers. The cues may be audible or visual and accentuate the fact that an outcome determinative event has occurred. If the player's wager has enough of the outcome determinative events selected relative to the actual outcome determinative events, the player may receive a benefit.

25 Claims, 21 Drawing Sheets

U.S. PATENT DOCUMENTS 5,401,024 A * 3/1995 Simunek ...................... 463/18
5,542,669 A 8/1996 Charron et al.
5,553,864 A 9/1996 Sitrick
5,604,542 A 2/1997 Dedrick et al.
5,611,729 A 3/1997 Schumacher et al.
5,772,511 A 6/1998 Smeltzer
5,816,916 A 10/1998 Moody
5,816,918 A * 10/1998 Kelly et al. .................. 463/16
5,851,149 A 12/1998 Xidos et al.
5,909,875 A 6/1999 Weingardt .................. 273/269
6,093,026 A 7/2000 Walker et al. ............... 434/322
6,102,400 A * 8/2000 Scott et al. .................. 273/269
6,113,495 A 9/2000 Walker et al.
6,135,884 A 10/2000 Hedrick et al.
6,183,361 B1 * 2/2001 Cummings et al. ............ 463/18
6,190,256 B1 2/2001 Walker et al. ................. 463/25
6,234,896 B1 * 5/2001 Walker et al. ................. 463/16
6,302,790 B1 10/2001 Brossard ...................... 463/20
6,331,143 B1 12/2001 Yoseloff
6,346,043 B1 2/2002 Colin et al.
6,398,643 B1 6/2002 Knowles et al.
6,508,709 B1 * 1/2003 Karmarkar ................... 463/42
6,554,703 B1 * 4/2003 Bussick et al. ................ 463/20
6,569,018 B2 * 5/2003 Jaffe .......................... 463/30
6,592,457 B1 7/2003 Frohm et al. .................. 463/16
6,599,129 B2 7/2003 Jenkins et al.
6,702,672 B1 3/2004 Angell et al. ................. 463/25
6,722,980 B2 * 4/2004 Stronach ...................... 463/25
6,811,484 B2 11/2004 Katz et al.
6,824,465 B2 11/2004 Luciano, Jr. ................. 463/18
6,895,166 B1 5/2005 Shriebman ................... 386/46
6,942,574 B1 * 9/2005 LeMay et al. ................. 463/41
7,241,219 B2 7/2007 Walker et al.
7,510,116 B2 * 3/2009 Robb et al. ................. 235/381
7,544,129 B2 * 6/2009 Baerlocher ..................... 463/9
7,562,051 B1 * 7/2009 Donner ........................ 705/67
7,566,271 B2 * 7/2009 Hostetler et al. .............. 463/25
2001/0036855 A1 * 11/2001 DeFrees-Parrott et al. ..... 463/17
2002/0142825 A1 * 10/2002 Lark et al. .................... 463/16
2002/0142846 A1 * 10/2002 Paulsen ....................... 463/43
2002/0175818 A1 11/2002 King et al. ............... 340/572.8
2003/0027621 A1 * 2/2003 Libby et al. ................... 463/17
2003/0073490 A1 4/2003 Hecht et al.
2003/0073491 A1 4/2003 Hecht et al.
2003/0104865 A1 6/2003 Itkis et al.
2003/0148808 A1 * 8/2003 Price ........................... 463/27
2003/0211881 A1 * 11/2003 Walker et al. ................. 463/20
2003/0224854 A1 * 12/2003 Joao ............................ 463/40
2004/0005918 A1 * 1/2004 Walker et al. ................. 463/16
2004/0043815 A1 3/2004 Kaminkow
2004/0053668 A1 3/2004 Baerlocher
2004/0054594 A1 3/2004 Forster et al. ................. 705/18
2004/0087357 A1 5/2004 Johnson
2004/0097283 A1 5/2004 Piper et al.
2004/0121834 A1 * 6/2004 Libby et al. ................... 463/19
2004/0176154 A1 9/2004 Finnochio
2005/0037832 A1 2/2005 Cannon
2005/0054445 A1 3/2005 Gatto et al.
2005/0059464 A1 * 3/2005 Bozeman ..................... 463/18
2005/0064925 A1 * 3/2005 Robb .......................... 463/16
2005/0085289 A1 4/2005 Bozeman ..................... 463/17
2005/0096125 A1 5/2005 LeMay et al. ................. 463/25
2005/0119052 A1 * 6/2005 Russell et al. ................. 463/42
2005/0288096 A1 12/2005 Walker et al. ................. 463/25
2006/0217178 A1 9/2006 Walker et al.
2007/0243934 A1 10/2007 Little et al.

OTHER PUBLICATIONS

G-Tech Enterprise Series, Altura Family of Terminals.
Gonzales, C.A. et al., “Requirements for motion-estimation search range in MPEG-2 coded video”, IBM Journal of Research and Development, 1999, vol. 43, No. 4, (http //www research ibm com/journal/rd/434/Gonzales html).
“Computer Assisted Video Analyzes—Max-Planck-Institute for Psycholinguistics”, (http //www mpi nl/world/tg/CAVA/CAVA html), download date: Jun. 9, 2005.
“Media Tagger: Macintosh-based video transcription”, (http //www mpi nl/world/tg/CAVA/mt/MtandDB html), download date: Jun. 9, 2005.
“IGT—Mata Hari Slots”, (http //www igt com/gaminggroup/games/game_detail asp?toggle—ovr&pid=5.113.120&type...), download date: Jun. 9, 2005.
“Video Transcription on PC—Max-Planck-Institute for Psycholinguistics”, (http //www mpi nl/world/tg/CAVA/ted/ted html), download date: Jun. 9, 2005.
“Drinking games—Star Wars Drinking Game.”, The Webtender (http //www webtender.com/handbood/games/starwars.game), download date Apr. 12, 2006.
Keno Rules, (http//keno-info.com/keno_rules.html), download date Apr. 14, 2006.
Office Action for U.S. Appl. No. 11/160,410 mailed Jul. 9, 2008, 11 pp.
Office Action for U.S. Appl. No. 11/160,410 mailed Nov. 28, 2007, 10 pp.
Office Action for U.S. Appl. No. 11/970,888 mailed Jun. 19, 2008, 11 pp.
Office Action for U.S. Appl. No. 11/970,888 mailed Oct. 27, 2008, 8 pp.
Office Action for U.S. Appl. No. 11/423,629 mailed May 19, 2010, 9 pp.
International Search Report for PCT/US07/68571 completed Sep. 1, 2008, 3 pp.
Written Opinion for PCT/US07/68571 completed Sep. 1, 2008, 8 pp.
International Search Report for PCT/US07/64859 mailed Sep. 19, 2008, 4 pp.
Written Opinion for PCT/US07/64859 mailed Sep. 19, 2008, 6 pp.

* cited by examiner

VIDEO CONTENT DETERMINATIVE KENO GAME SYSTEM AND METHOD

CROSS REFERENCE TO RELATED APPLICATIONS

The present application is a continuation-in-part of U.S. patent application Ser. No. 11/160,410, filed Jun. 22, 2005 now abandoned, entitled METHODS AND APPARATUS FOR FACILITATING A PAYOUT AT A GAMING DEVICE USING AUDIO/VIDEO CONTENT and now abandoned and claims the benefit of U.S. Provisional Application Ser. No. 60/582,377, filed Jun. 23, 2004 entitled GAMING DEVICE WITH OUTCOME COMPARISON FEATURE, both of which are hereby incorporated by reference in their entireties.

The present application relates to gaming devices and more particularly to keno-based gaming devices and systems.

Keno has been around in one form or another for approximately two millennia. Popular wisdom indicates that Chinese emigrants working on the railroads introduced Keno to the United States, and its popularity has waxed and waned according to the whims of popular fashion. In current years, Keno has seen its popularity wane dramatically, in part because of alternate entertainment options available to gamblers, and in part because Keno, is, at its core, not a glamorous or even an intrinsically entertaining game. In contrast, casinos and gaming establishments have invested millions of dollars in presenting glamorous alternatives for visitors. Instead of waiting for a number to appear on a keno monitor, potential players are distracted by flashier machines, seeing shows with large production budgets, shopping, eating, or otherwise being entertained.

However, Keno remains a game in which the house advantage is large, typically around twenty to thirty percent, or more. As such, Keno, would, if its audience base could be expanded, remain a lucrative part of a gaming establishment's gaming stable. Thus, there is a need to revitalize Keno and make Keno more attractive to potential players.

At the same time that Keno languishes in moderate obscurity, many copyrighted works also languish in figurative darkness with no venue in which they may be displayed. That is, despite the proliferation of television series DVD releases and numerous channels dedicated to seemingly every genre of entertainment, many television shows and movies remain idle and do not generate income for the owners. Even in those instances where a venue does exist to replay these works, most copyright owners are always interested in exploring new opportunities with which to generate more revenue.

People have a history of using audiovisual works for different types of games. Simple games such as buzzword bingo are prevalent on college campuses throughout the United States. Such games usually revolve around drinking and a favorite movie. The movie is begun, and the players imbibe of an adult beverage when certain specific events happen in the movie. For example, the venerable movie trilogy STAR WARS® has generated the "Star Wars Drinking Game" where players consume their beverage when, inter alia, an onscreen character exclaims that they have "a bad feeling about this". More formally, the parent application, U.S. patent application Ser. No. 11/160,410, introduced the concept of video content being used to determine an outcome for a variety of gaming devices including Keno, but focused heavily on a slot machine embodiment. The present invention provides a more detailed exploration of a keno game whose outcome is determined by video content.

DETAILED DESCRIPTION OF THE PRESENT INVENTION

Figure 1:
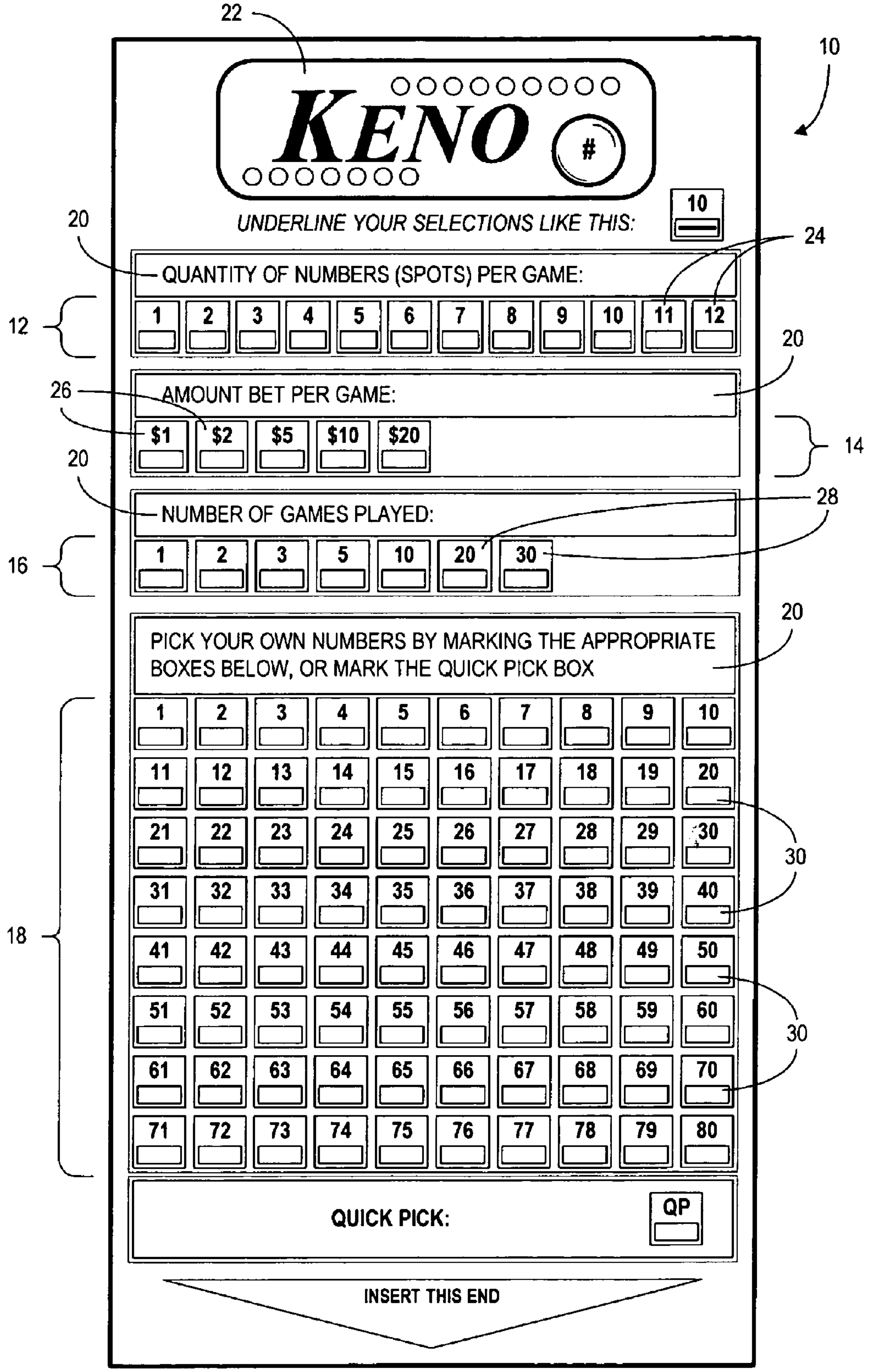
FIG. 1 PRIOR ART
FIG. 1 illustrates a conventional keno ticket.

At least some embodiments of the present invention tie events in video content to a keno game such that the events of the video content determine winning outcomes in an associated keno game. In place of the traditional stream of numbers being posted to alert players of winning outcomes, embodiments of the present invention display video content to the players. Certain events within the video content are marked with a cue in such a manner as to alert the players that the certain event is an outcome determinative event. By way of analogy, the outcome determinative event corresponds to a drawn number in a more conventional keno game. If a player matches enough pay events marked with a cue in the video content with pay events selected on their keno receipt, the player receives a benefit.

Before addressing the particulars of the present invention, a more detailed discussion of conventional Keno is provided with reference to FIGS. 1-5B. The discussion of the present invention begins below with FIG. 6. In its simplest form, traditional keno resembles a type of lottery. Players usually pick up a keno ticket 10, such as that illustrated in FIG. 1. The keno ticket 10 has several fields 12, 14, 16, and 18 as well as instruction lines 20 and perhaps a logo 22. The first field 12 has spot indicia 24 that allow a player to indicate a quantity of numbers that the player can select. The numbers are frequently called "spots" in the gaming industry. The second field 14 has bet indicia 26 that allow the player to indicate the amount that is wagered. The third field 16 has game indicia 28 that allow the player to indicate over how many games the numbers and wagers are to be maintained. Finally, the fourth field 18 has number indicia 30 that allow the player to select the numbers or spots on which the wager is placed. Thus, for example, if the player has indicated that they desire a three-spot game, three number indicia 30 would be marked in the fourth field 18.

Figure 2:
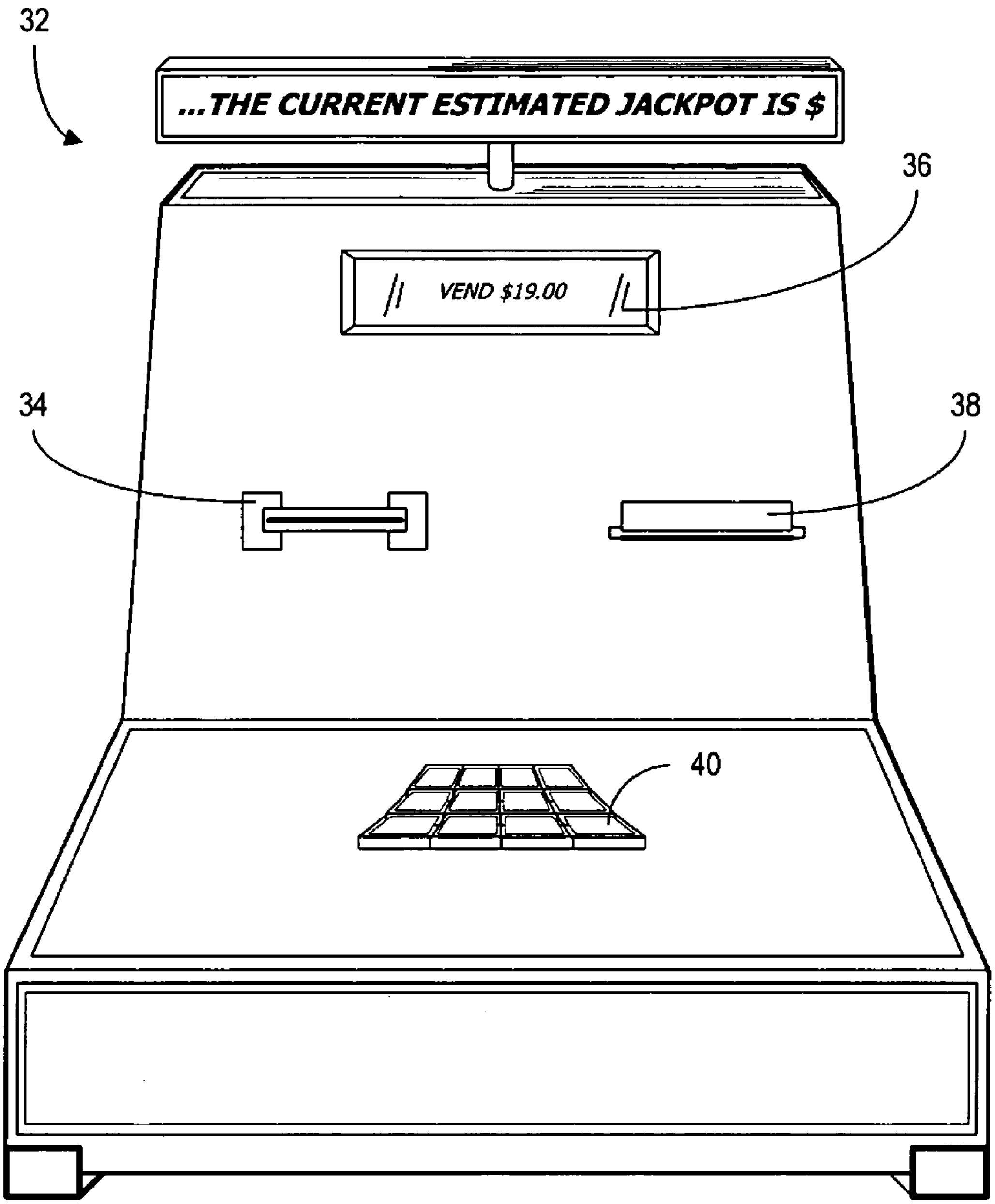
FIG. 2 PRIOR ART
FIG. 2 illustrates a conventional keno terminal.

The player takes the keno ticket 10 to a keno booth where the attendant uses a keno terminal, such as keno terminal 32 illustrated in FIG. 2, to scan in the keno ticket 10 and accept payment of the wager. In particular, the attendant may insert the keno ticket 10 into an input 34. The input 34 could correspond to the data reading apparatus of U.S. Pat. No. 4,659,073, which is hereby incorporated by reference in its entirety, or equivalent device. Data may be read from the keno ticket through a device such as the marked card reader of U.S. Pat. No. 4,724,307, which is hereby incorporated by reference in its entirety, or equivalent device. Relevant information may appear on the display 36 and a printer (not shown explicitly) may print a receipt that is output at printer port 38. Alternatively, the keno ticket 10 may be regurgitated at the input 34 as is taught in the previously incorporated '073 patent. If necessary, the attendant may use keypad 40 or other input to create or modify the data that appears on a keno ticket 10 and/or the receipt. The attendant then provides the player with a keno receipt that has indicia thereon proving the player's selections. For some keno terminals 32, the keno receipt is the regurgitated keno ticket 10, perhaps with some additional markings thereon or one from which a unique bar code or other identifying characteristic has been read such that the keno ticket 10 is known to the keno terminal 32.

It is possible that keno terminal 32 has an associated cash drawer that the attendant uses to accept wagers and make change, or the attendant may use an associated cash register (not shown explicitly, but well understood in the industry) for the cash handling purposes.

Figure 3:
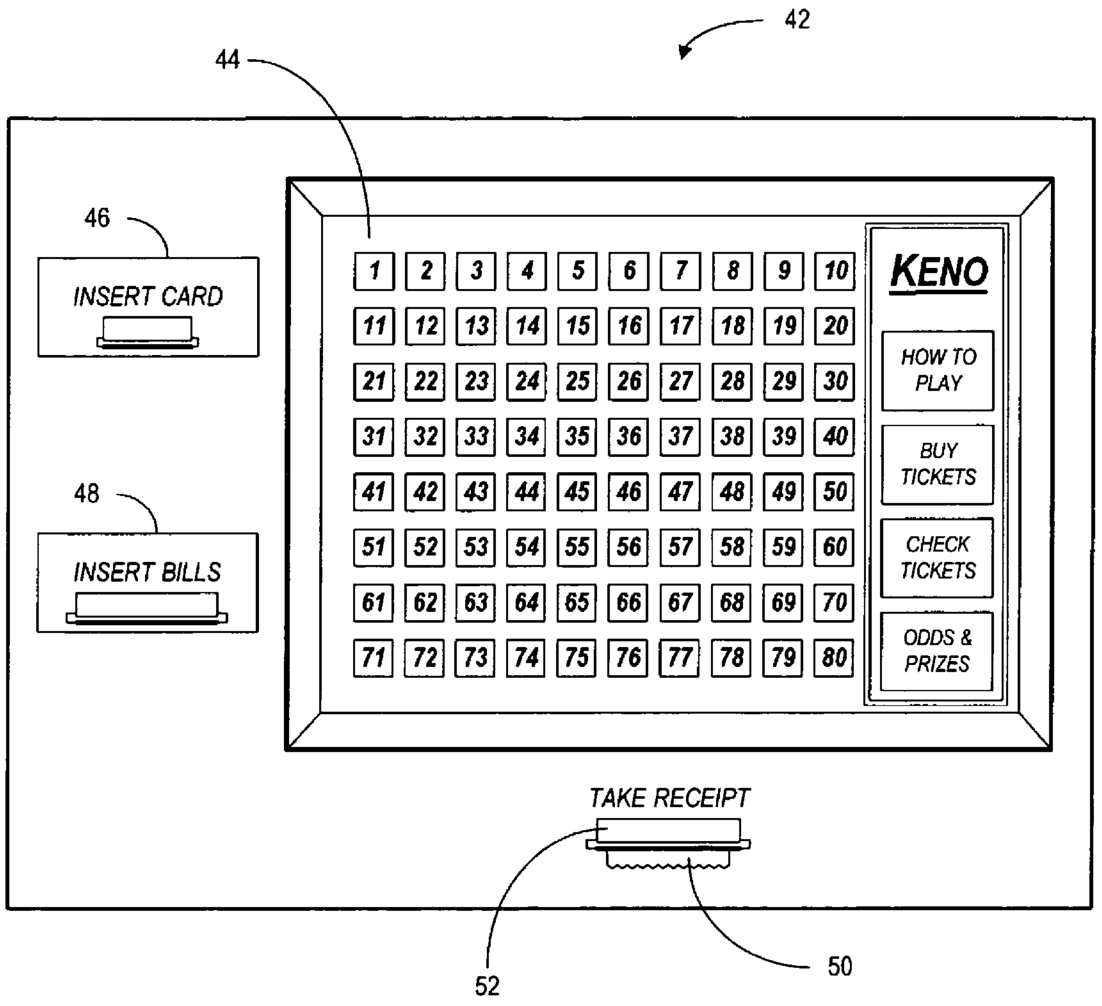
FIG. 3 PRIOR ART
FIG. 3 illustrates a conventional self-service keno terminal.

Alternatively, some establishments have moved to more self-serve keno kiosks, such as keno kiosk 42 shown in FIG. 3. The self-serve keno kiosk 42 includes a display 44, which is usually a touch-screen display having instructions and fields through which the information on the traditional keno ticket 10 may be input to the self-serve keno kiosk 42. The self-serve keno kiosk 42 also usually has one or more payment acceptors such as a magnetic card reader 46 and/or a cash acceptor 48. Once payment for the wager has been made and the appropriate selections made, a keno receipt 50 is generated at printer port 52.

Exemplary conventional keno terminals 32 and self-serve keno kiosks 42 are sold by SCIENTIFIC GAMES Corporation of 750 Lexington Avenue, New York, N.Y. 10022, as the PROBE XL series multi-function gaming system and by GTECH Corporation of 55 Technology Way, West Greenwich, R.I. 02817 as the ALTURA system.

The player then locates a keno monitor 54 (FIG. 4) and watches numbers be drawn. The keno monitor 54 usually has a split display with a game designating field 56 and a number field 58. A typical keno monitor 54 may be, for example, fifty-two inches (~132 cm) wide by forty-seven inches (~119 cm) tall. The number field 58 allows individual numbers to be illuminated so as to indicate which numbers have been drawn. For the exemplary keno monitor 54 of FIG. 4, the current game is game four hundred fifty-six; number seventy-one has been drawn and is illuminated (60); but element seventy-two has not been drawn, and so is not illuminated (62).

Typically, each minute a number is drawn and illuminated on the keno monitor 54. Once twenty numbers have been drawn (from amongst the possible eighty), the game ends. Players win if enough of their selected spots match the drawn numbers. Odds and payouts vary depending on the establishment, but a typical payout for a one dollar wager on a five spot selection might be \$450 if all five spots are matched, \$20 if four of the five are matched, \$2 if three of the five are matched, and nothing if only one or two match.

If the player has a winning outcome, the player returns to the keno booth with the keno receipt. The attendant confirms the winning outcome and provides the payout to the player. Again, cash handling duties may be handled with the keno terminal 32 or an associated cash register as needed or desired. One way in which the keno receipt may be confirmed is by inserting the keno receipt into the input 34 and allowing the keno terminal 32 to scan the data thereon. As noted, the keno receipt may be valid for more than one game if the player has made the appropriate designation and paid the appropriate wager with the keno ticket 10.

In some self-serve keno kiosks 42, there is no need for the player to use a keno monitor 54 because the display 44 serves this purpose. In this instance, the keno player may not receive a keno receipt, but the player's selections are stored in the self-serve keno kiosk 42 and the redemption occurs immediately without having to interface with a keno attendant. Such self-serve keno kiosks 42 are well understood in the industry. One example of a complete self-serve kiosk is a video keno terminal (not shown explicitly). Video keno is an individual video version of the regular casino Keno. The game is begun by placing a wager (coins or tokens) into the machine's slot. Then, just as is in regular Keno, the player is presented a screen (display 44) with eighty numbers, one through eighty. The player then simply picks the number he or she wishes to play—as few as one, as many as twenty. The machine then randomly selects twenty numbers. Players are paid based on how many of their numbers match those selected by the machine. An example of such a video keno terminal is disclosed in U.S. Pat. No. 5,192,076, which is hereby incorporated by reference in its entirety.

For more information on the rules of a traditional keno game, the interested reader is referred to the incorporated patents and http://www.keno-info.com/keno_rules.html, a copy of which is filed concurrently with this disclosure.

Keno is a reasonably hardware intensive game and may involve more initial expenditures than small operations are willing to incur. Likewise, because keno is a form of gambling, some areas may subject all keno games for money value to strict oversight controls or mandate that the keno games be run through a centralized authority who may subsidize placement of the hardware in exchange for a portion of the proceeds or other deferred compensation. Alternatively, large gambling establishments may have their own internal keno management system. In either case, there is usually centralized control of the keno games. These two situations are illustrated in FIGS. 5A and 5B respectively.

Figure 5A:
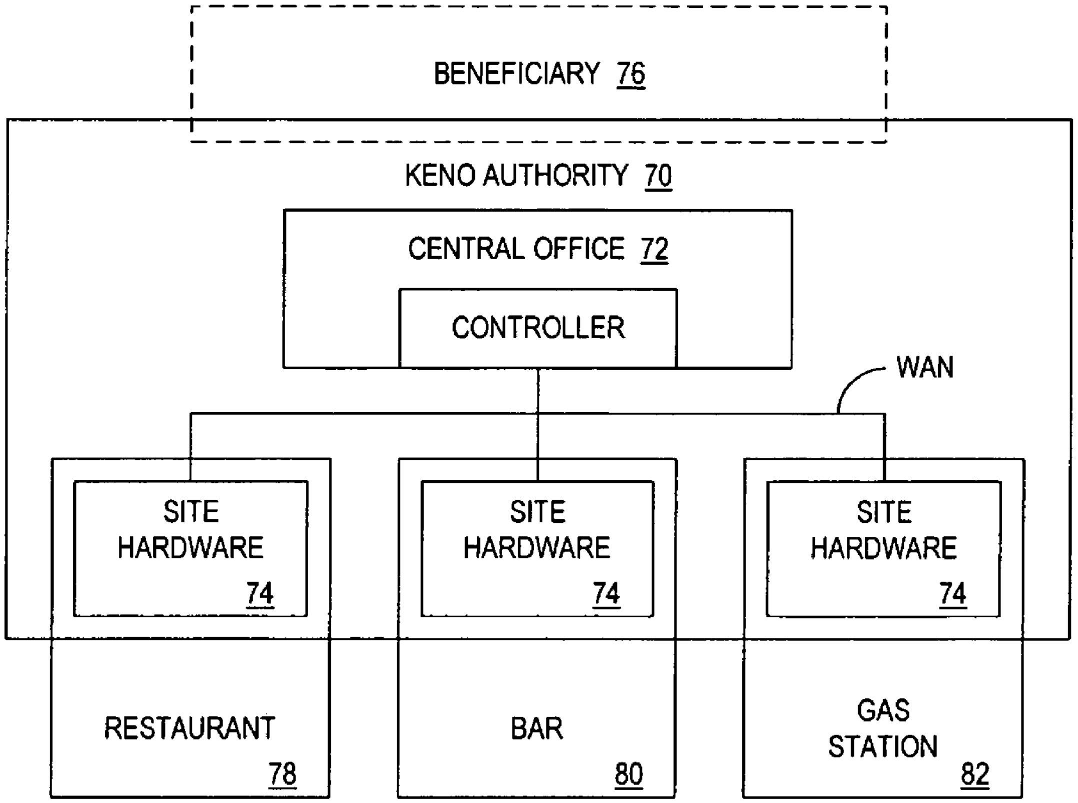
FIG. 5A PRIOR ART
FIGS. 5A & 5B illustrate two conventional keno hierarchies.
Figure 5B:
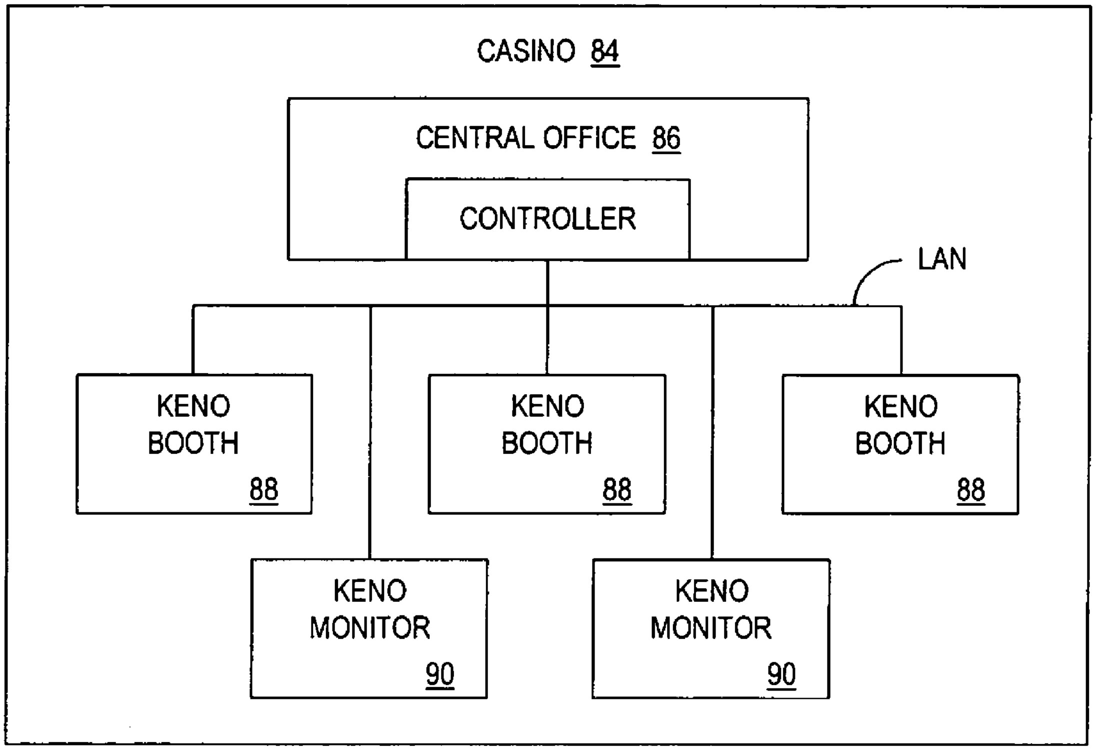
FIG. 5B PRIOR ART

In FIG. 5A, a keno authority 70 may have a central office 72 that manages all the keno operations for a particular jurisdiction or entity. In particular, the central office 72 may include a controller with a random number generator (not shown explicitly) that draws numbers for keno games in a secure manner. The central office 72 communicates with site hardware 74 through a wide area network (WAN). The WAN may be wire based, wireless, terrestrial, satellite-based, dedicated transmission media, shared transmission media, public, proprietary, or the like as needed or desired, although a secure communication link is likely to be required to prevent unauthorized communication thereon.

The keno authority 70 may be operated by the beneficiary 76 or may report to the beneficiary 76 to which all the proceeds are eventually paid. For example, a state lottery commission may be the beneficiary of a statewide keno game. The state lottery commission may directly run the keno game or contract with an entity that manufacturers the keno hardware such as SCIENTIFIC GAMES or GTECH to handle the day-to-day operations of the keno game. In the former case the state lottery commission doubles as the keno authority 70, and in the latter case, the state lottery commission is the beneficiary 76, but the third party entity is the keno authority 70. Differing contractual obligations may modify or blur these distinctions somewhat, but these distinctions provide a convenient conceptual framework within which to discuss embodiments of the present invention.

The site hardware 74 may be the keno terminal 32, the self-serve keno kiosks 42, the keno monitors 54 or other equipment as is well understood, and this equipment is positioned in a number of keno gaming establishments such as a restaurant 78, a bar 80, a gas station 82 or the like as needed or desired. Employees of the keno gaming establishments act as the keno attendants, accepting wagers and keno tickets 10 from players, dispensing keno receipts, and handling keno payouts as appropriate. The keno authority 70 services the site hardware 74, handles the drawing of the numbers, providing the drawn numbers to the keno gaming establishments, accounting for all keno proceeds, and paying larger keno winners as is well understood.

Certain casinos and other larger scale operations that are not subject to state lottery commission oversight may run their own keno games as illustrated in FIG. 5B. Casino 84 has its own central office 86 akin to the central office 72, but typically located on the premises of the casino 84. The central office 86 communicates with keno booths 88 and keno monitors 90 through a local area network (LAN). The LAN may be wireless or wirebased and use any appropriate communication method as needed or desired, although again a secure communication link is likely to be required.

Against the backdrop of traditional Keno, embodiments of the present invention provide an exciting alternative that adds video content to the game. However, before providing an explanation of the embodiments of the present invention, a few terms are defined. As used herein, the term "keno authority" means the entity that is responsible for facilitating a keno game across one or more machines. The term keno authority thus encompasses the casino's central office 86 and/or the entity that runs statewide keno games and the like.

The term "keno gaming establishment" means a location that allows keno gaming to take place therein. Exemplary keno game establishments are casinos, restaurants that offer keno games while you dine, bars with keno games, gas stations with keno games, convenience stores with keno games, and the like. It is expected that in some jurisdictions, the keno gaming establishment must be an age-restricted establishment, but not every jurisdiction has such requirements, so such is not a prerequisite for inclusion as a keno gaming establishment.

Figure 4:
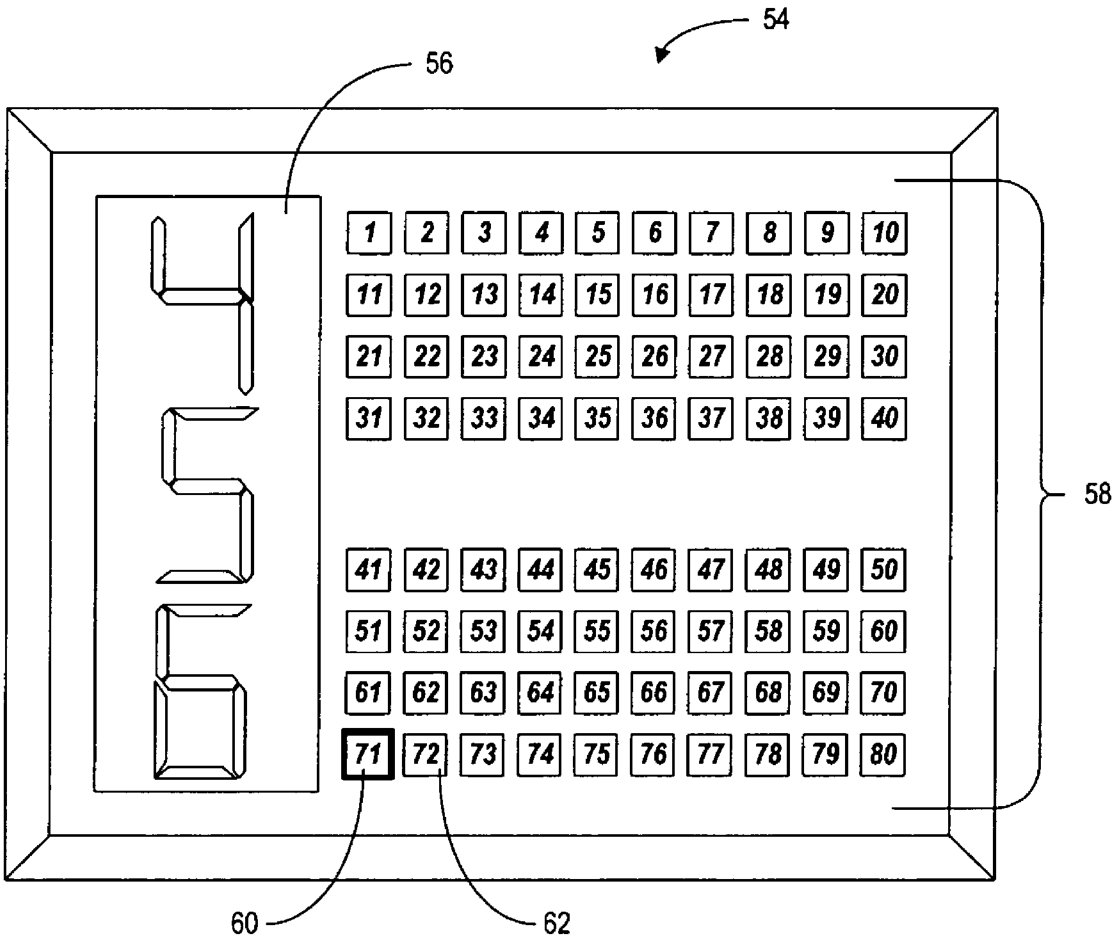
FIG. 4 PRIOR ART
FIG. 4 illustrates a conventional keno monitor.

"Video content" means a series of images, moving or still, presented in a changing sequence to an audience, but specifically does not include progressive, selective indication of keno numbers that is devoid of further content, such as is done on a prior art keno monitor as described with reference to FIG. 4. Exemplary video content may be a film or television show. Many further examples of appropriate video content are provided below. Specifically excluded from this definition are conventional keno monitors that selectively illuminate drawn numbers and video keno game displays that have a series of images whose function is to convey which of the possible numbers have been drawn in a traditional keno game. While these might loosely be considered a changing sequence of images, this level of change is not sufficient to be video content for the purposes of the present invention.

A "video clip" is video content that is stored in some manner. In every possible stored embodiment of the video clip there is some physical element associated with the storage. That physical element may be a reel of edited film, a DVD, a VHS tape, or more esoterically, the electric or magnetic charges in a computer readable memory device or other transmission medium that contain the binary data forming the information that, when read by a playback device forms the images of the video content. All of these possible storage media are included within the concept of a video clip. A video clip may include audio data.

An "event" is a scene, element within a scene, or activity within a scene of video content that is capable of being differentiated from another scene, element within a scene, or activity within a scene of the video content. The differentiation may be thematic or otherwise as needed or desired.

A "pay event" is an event within video content that is used in some manner by the video content determinative keno game. Numerous sub-categories of pay events are contemplated and described below.

A "potential pay event" is a pay event that can be used in the keno game (e.g., by an entity facilitating the keno game) to determine an outcome of the game, but it is as of yet uncertain whether that particular pay event is an outcome determinative pay event. A potential pay event is analogous to one of the numbers one through eighty from which winning numbers are drawn in traditional Keno.

An "outcome determinative pay event" or a "drawn pay event" is a pay event that dictates the outcome of the keno game. In this regard, an outcome determinative pay event or drawn pay event is analogous to the numbers drawn in traditional Keno.

A "pay event marked with a cue" is an outcome determinative pay event that has a cue added to it in some fashion such that a keno player or person viewing the video content is informed of the fact that the pay event is an outcome determinative pay event.

A "selected pay event" is a potential pay event that is selected by the player or the keno terminal from amongst the set of potential pay events and on which the player is gambling that the outcome of the keno game is determined. A selected pay event is analogous to a number that a player selects on her keno ticket 10 when making a wager in traditional Keno.

A "video based keno game" is a keno game whose outcome is determined at least in part by video content. The term video based keno game specifically excludes conventional keno games such as video keno.

The present invention energizes the somewhat static and luctual keno game by replacing the drawing and display of numbers with the display of video content. In particular, events within the video content replace (and/or complement) the traditional numbers. Instead of wagering on whether a particular number will be drawn, the players wager on whether potential pay events are present and marked with a cue in the video content. As the video content is presented, the content of the video presents one or more of the potential pay events. One or more of the potential pay events are marked with a cue so as to indicate its impact on game play. If the player's receipt has enough selected pay events corresponding to pay events marked with a cue within the video content, the player may receive a benefit. Numerous variations exist on the manner of designating pay events, selecting pay events, and the playback of the video content, all of which will be discussed in greater detail below.

Figure 6:
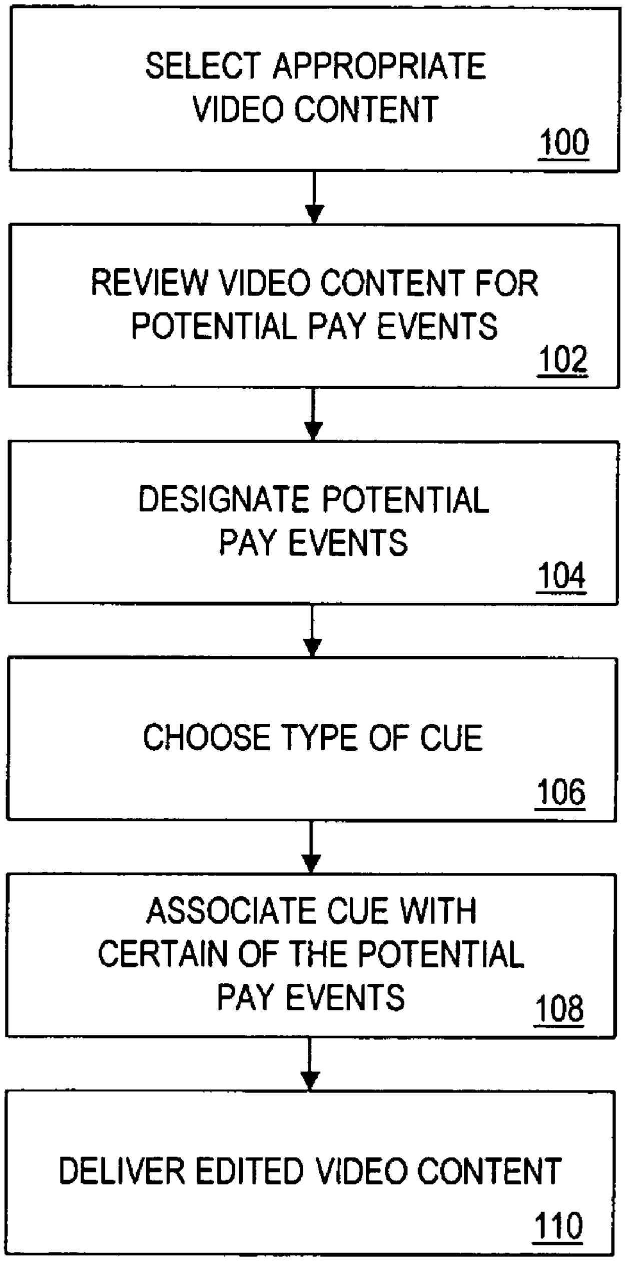
FIG. 6 illustrates a method of creating video content, according to an embodiment of the present invention.

Turning to FIG. 6, a process in accordance with some embodiments of the present invention begins with the selection of appropriate video content (block 100). Almost any video content can be adapted for use with the present invention. Embodiments of the present invention contemplate the following non-exclusive list of sources for video content: feature films, including theatrical, extended director's cuts, and edited for television versions; reruns of television shows of any genre; current television shows of any genre; sporting events, including live, delayed, and reruns; animated cartoons; situational comedies; syndicated television shows; reality television shows; news; weather; cable television channel programs; short films, including music videos, animated shorts, art house films, and the like; screen captured recordings of massively multiple online role playing games; casino footage of table top game play; nature shows; cooking shows; weather shows; educational documentaries; historical documentaries; and the like. Another possibility that could be used as video content is a slide show of photographs. For example, recent JIMMY BUFFETT® concerts have been preceded by a five to ten minute montage of photographs taken the day of the concert by Mr. Buffett and his entourage in and around the town in which the concert is to take place. Also included are photographs from the festivities in the parking lot from immediately before the concert and a few crowd shots taken as the audience is entering the concert venue. Similar sorts of photograph slide shows detailing daily candid shots in and around a particular venue could be created for keno hosts such as cruise ship, casinos, and the like. For the purposes of the present invention such photomontages are included within the definition of video content. In short, almost any video that contains changing imagery or dialogue can be selected. While the previous recitation assumes single episode style sources of video content, the present invention's concept of video content includes montages, trailers, teasers, and similar amalgamations from multiple sources. For example, segments from multiple episodes of a television series may form video content. Similar montages of a sport team's season or history may form video content. For the purposes of explanation, the single season of the discontinued television series SPACE ABOVE AND BEYOND™ is selected at block 100.

The video content may be in any executable audio/video programming file such as an MPEG2, MPEG, AVI, MOV, WAV, DivX, or other similar file as is known in the art. Likewise, the video content may be stored in any sort of memory device such as compact disc, digital versatile disc (DVD), optical disc, video home system (VHS) tape, universal serial bus (USB) memory device, hard drive, zip drive, or the like as is well understood, although a portable or transmittable combination of formats and storage systems facilitates use of the present invention.

The video content is then reviewed for potential pay events (block 102). As noted above, a potential pay event is an event that occurs in the video content that is distinctive enough to be recognizable as a potential pay event by a keno player. Exemplary pay events include, but are not limited to: a character entering a scene (perhaps in a distinctive manner), a character leaving a scene, a character delivering a memorable line or quip, the presence of an object, creature or landmark in the scene or background, the presence of a particular product, an explosion, a gunfight, an argument, a kiss, the revelation of a secret identity, laugh tracks, a romantic encounter, particular background music, and the like. Exemplary potential pay events from the example television series might include the presence of Commodore Glen Van Ross, the presence of the Commodore's guitar Rosalyn, Lieutenant Colonel McQueen's pithy comeback "Yes you would sir. But we'll talk about your mother when I get back", the presence of the Chaplain, the playing of a twentieth century audio recording by a character, the presence of Chiggy Von Richtofen, Lt. Wang kissing Lt. Damphousse, the identification of a character as an InVitro, a space fight, the death of a marine, Lt. Hawkes firing a pistol, the presence of a silicate, and the like.

Once all the potential pay events are identified, the potential pay events may be internally designated as such (block 104). In an exemplary embodiment, potential pay events are internally designated as potential pay events by tags. A tag is information stored in association with the video content that is separate from the portion of the video content that is output to a keno player. While it is expected that the tag will be stored in some form of auxiliary channel ascertainable by a video playback device, the present invention is not so limited. One exemplary tag is information identifying the potential pay event stored in the vertical blanking interval of the video content. One exemplary technique for using the vertical blanking interval is described in U.S. Pat. No. 6,895,166, which is hereby incorporated by reference in its entirety. Thus, in the example television series, each of the above-mentioned potential pay events is tagged in the vertical blanking interval of the video content.

Having designated the potential pay events within a particular video clip, the potential pay events that are actually going to be the drawn pay events must be highlighted as such. In an exemplary embodiment, the highlighting is done through the use of a cue capable of being perceived by a player. There are numerous types of cues that could be used, including, but not limited to: broadly: audible and visual cues, with more specific examples being: a pop-up bubble, instant messenger messages, overlaid text, overlaid graphics, inserted video clips; inserted audio clips, picture-in-picture alerts, a ticker running across or beside the video content with text alerts thereon, a sidebar, a header, a footer, a voice-over, a pause in the video, closed-caption text, or the like. From amongst the various types of cues available, the editor chooses a type of cue that is desired for drawn pay events (block 106). Cues do not have to be uniform throughout the video content, although they may be for trade dress, branding, or general aesthetic purposes. Note that it is also possible that some third party instructs the editor on what type of cue to use. For example, a television studio may license its works only on the condition that particular types of cues are to be used, or a keno authority 70 may desire all its video content to be marked with similar cues for branding or trade dress purposes. It may be possible to tie the cues thematically to the video content. For example, the physical, slapstick humor of the THREE STOOGES™ is well suited to overlaid graphics exclaiming "POW! PAY EVENT!" or "BONK! PAY EVENT!" or the like. Conversely, a show of a different genre, such as CHARMED™ might be more amenable to closed-caption text or a discrete bell-tone. In the example of SPACE: ABOVE AND BEYOND™, the cue selected is a pop-up bubble shaded white to contrast with the heavy blacks and grays of the video content.

Having chosen a desired cue (or cues), certain ones of the potential pay events are marked with or associated with a cue (block 108). That is, appropriate information is added to the video content such that when the video content is displayed, the cues are readily ascertainable by the viewing public. If tags are being used, the information from the tag is associated with the cue such that the occurrence of the appropriate tag causes the cue to be presented. Alternatively, the information in the tags associated with the drawn pay events is changed to reflect that not only is the event a potential pay event, but the potential pay event is also a drawn pay event and a cue should be presented. As yet another alternative, if tags are not used (and they are not required by the present invention), the video content may be directly edited to present the cue. In an exemplary embodiment, software such as ADOBE® INDESIGN® sold by Adobe Systems Incorporated, 345 Park Avenue, San Jose, Calif. 95110-2704, or MACCAPTION™ and/or CCAPTION™ sold by CPC Computer Prompting and Captioning Co. of 1010 Rockville Pike, Suite 306 Rockville, Md. 20852, could be used to add the cues to the video content. Other hardware or software could be used if needed or desired, and the software identified herein is by way of example only. In addition to the cues of embodiments of the present invention, additional editing to include voiceovers or add video to the video content may be performed. These may be game instructions, endorsements such as "I am Bob Dole, and I approved this video content,", casino promotions, other advertisements, or the like as needed or desired. Additionally, some material may be removed during editing, such as, for example, commercials, mature content, and/or generally abridging the video content to meet time constraints. In the example television series, the drawn pay events are: the presence of Rosalyn, the presence of the Chaplain, a character being revealed as an InVitro, the death of a marine, the presence of a silicate, the presence of Commodore Van Ross, Lt. Colonel McQueen making a quip, Lt. Hawkes firing a pistol, a kiss, and a space fight, and thus these potential pay events are the pay events marked with cues.

The number of possible cues makes differentiating between the various cues potentially problematic. A first solution is to make the text of the cues sufficiently distinct from each other. A second solution is to have a short hand way to describe a particular cue that is sufficiently distinct from other short hand descriptors. Such short hand descriptors are sometimes referred to herein as identifiers. The cue may contain these identifiers or not as needed or desired. Thus, the previous paragraph's examples of drawn pay events are, in effect, a recitation of identifiers of the drawn pay events. More esoteric identifiers could be used. An identifier could be a unique alphanumeric string associated with a cue (e.g., 8AD97J52F5) or a phrase that describes the pay event (e.g., the identifier for the pay event 1977 FORD MUSTANG could be the phrase "1977 Ford Mustang"). Video content editors, video based keno players, keno game establishments, and the like may all use identifiers as needed or desired, and their use remains optional.

The edited video content is then delivered (block 110). In an exemplary embodiment, the edited video content is delivered to a keno authority 70 for redistribution to keno game establishments. To the extent that many keno authorities 70 are also manufacturers of keno terminals, delivery may be made to manufacturers of keno terminals. Even if the manufacturer of keno terminals is not a keno authority 70, edited video content may be delivered to such entities so that they may sell a complete package of keno terminals and video content. In another alternate embodiment, the edited video content is delivered directly to the keno game establishments. In still another alternate embodiment, the edited video content is then made available for sale to whomever might wish to purchase the edited content. Such an offering for sale is also within the scope of delivery of content as used herein.

The delivery of the video content may take different forms. In a first exemplary embodiment, a video clip formed from a memory device with the video content stored thereon is packaged in traditional packaging and delivered (for example, a DVD with the video content, tags, and cues is delivered in traditional DVD cases or jewel cases). In a second exemplary embodiment, the video clip is an electronic file sent to the intended recipient without a specific storage medium (for example, a file could be attached or embedded in an email or the file could be transmitted wirelessly or over a wire medium to the intended recipient). In this case, the packaging is the delivery mechanism (email, streamed video, and the like as needed or desired). The intended recipient could then store the file in a hard drive or other memory device as needed or desired.

While the process of FIG. 6 has been described as taking place in a particular order and linear style, it should be appreciated that a different sequence of events occurring sequentially or concurrently may be implemented as well. For example, the tagging and marking with cues could occur concurrently with the identification of the potential pay events, or the decision on which cues are to be used could occur before the potential pay events are identified. Other variations are also possible. Likewise, while the procedures set forth in relation to FIG. 6 are contemplated as being done before distribution to keno game establishments, as will be described below, there are numerous other ways to edit the video content and insert the cues. The discussion of some of these alternate techniques occurs after the discussion of FIGS. 20A & 20B.

Figure 7:
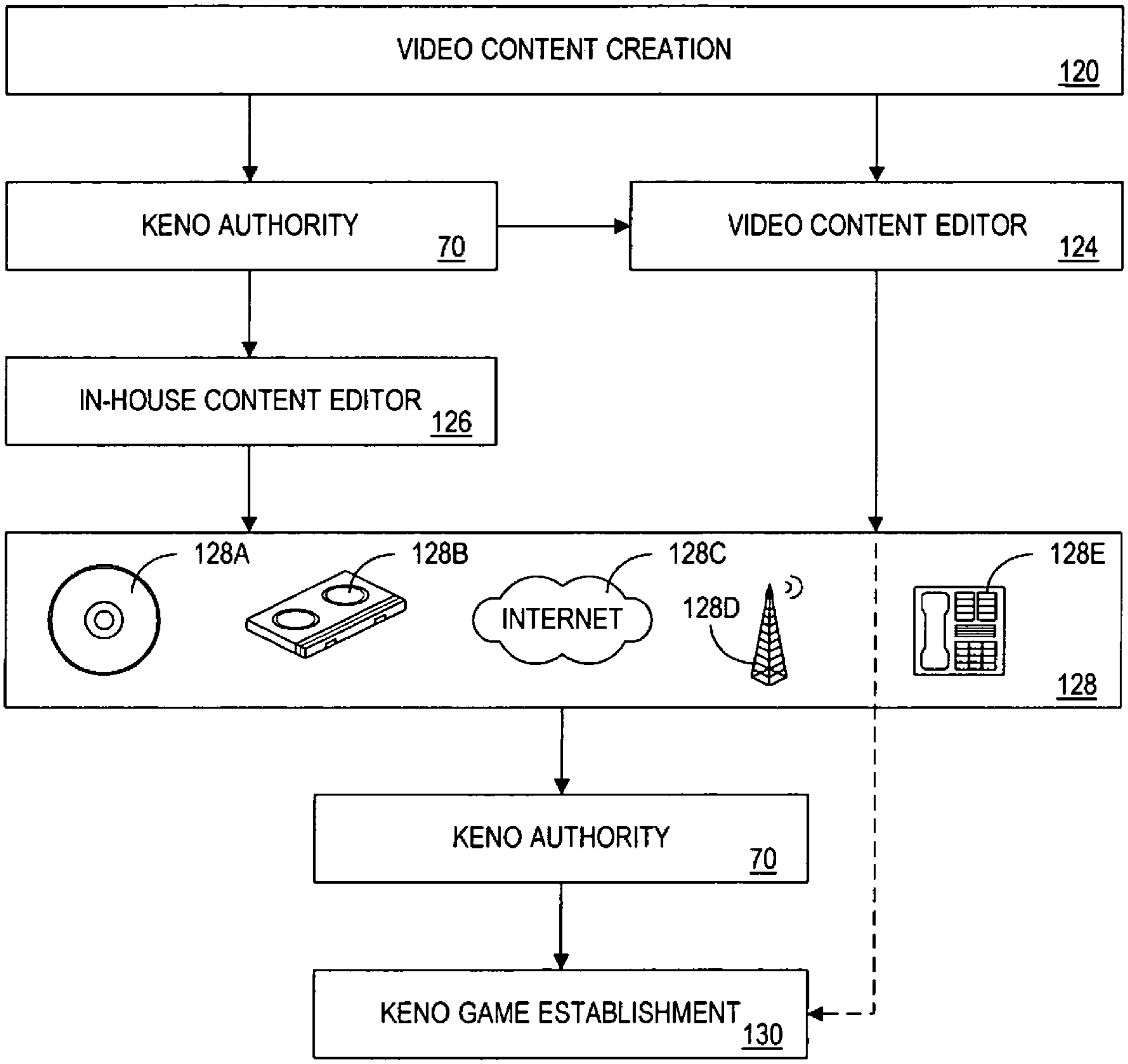
FIG. 7 illustrates exemplary distribution processes for the video content, according to an embodiment of the present invention.

Conceptually, the distribution of the video content is illustrated in FIG. 7, wherein the video content is created in the traditional fashion (block 120) (e.g., a person with a camera films a location and/or person with or without voice to create the video content). This video content is delivered in any video clip format to either a keno authority 70 or a video content editor 124. The keno authority 70 may then send the video content to the video content editor 124 or may have an in house video content editor 126 perform the video editing to secure video content with the desired cues. The video content editors 124/126 may have a wide latitude in identifying potential pay events and marking drawn pay events with cues, or, the video content creator or the keno authority 70 may provide explicit instructions on which events are potential pay events and which events are drawn pay events that need to be marked with a specific cue. The degree of freedom afforded the video content editors 124/126 is a continuum, and the precise place on the continuum is not critical to the present invention. Once the video content is edited to include the pay events marked with cues, it is delivered back to the keno authority 70 as a video clip. The delivery of the video clip with the edited video content back to the keno authority 70 may be done through any suitable medium 128, including, but not limited to: memory disc 128A, tape 128B, an electronic file delivered over the internet 128C, a recording sent through a wireless network 128D (UHF, VHF, RF, and the like), through a dedicated wirebased transmission medium 128E (such as the Public Switched Telephone Network (PSTN)), or the like. The keno authority 70 then provides the edited video content to the keno game establishment 130 under the terms of the contracts with the keno game establishments 130. Alternatively, the video content editor 124 may provide the edited video content directly to the keno game establishment 130. Note that delivery to the keno game establishment 130 includes delivery to site hardware 74 controlled by the keno authority 70.

Figure 8:
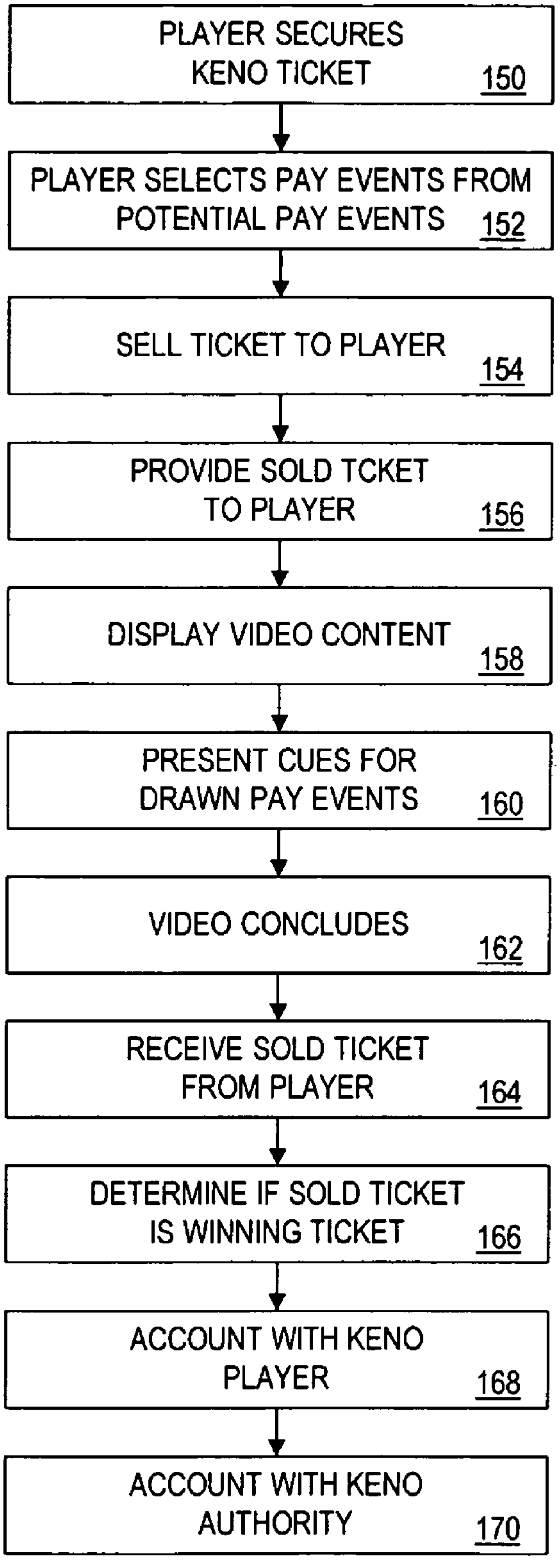
FIG. 8 illustrates an exemplary video content determinative keno game method according to an embodiment the present invention.
Figure 9:
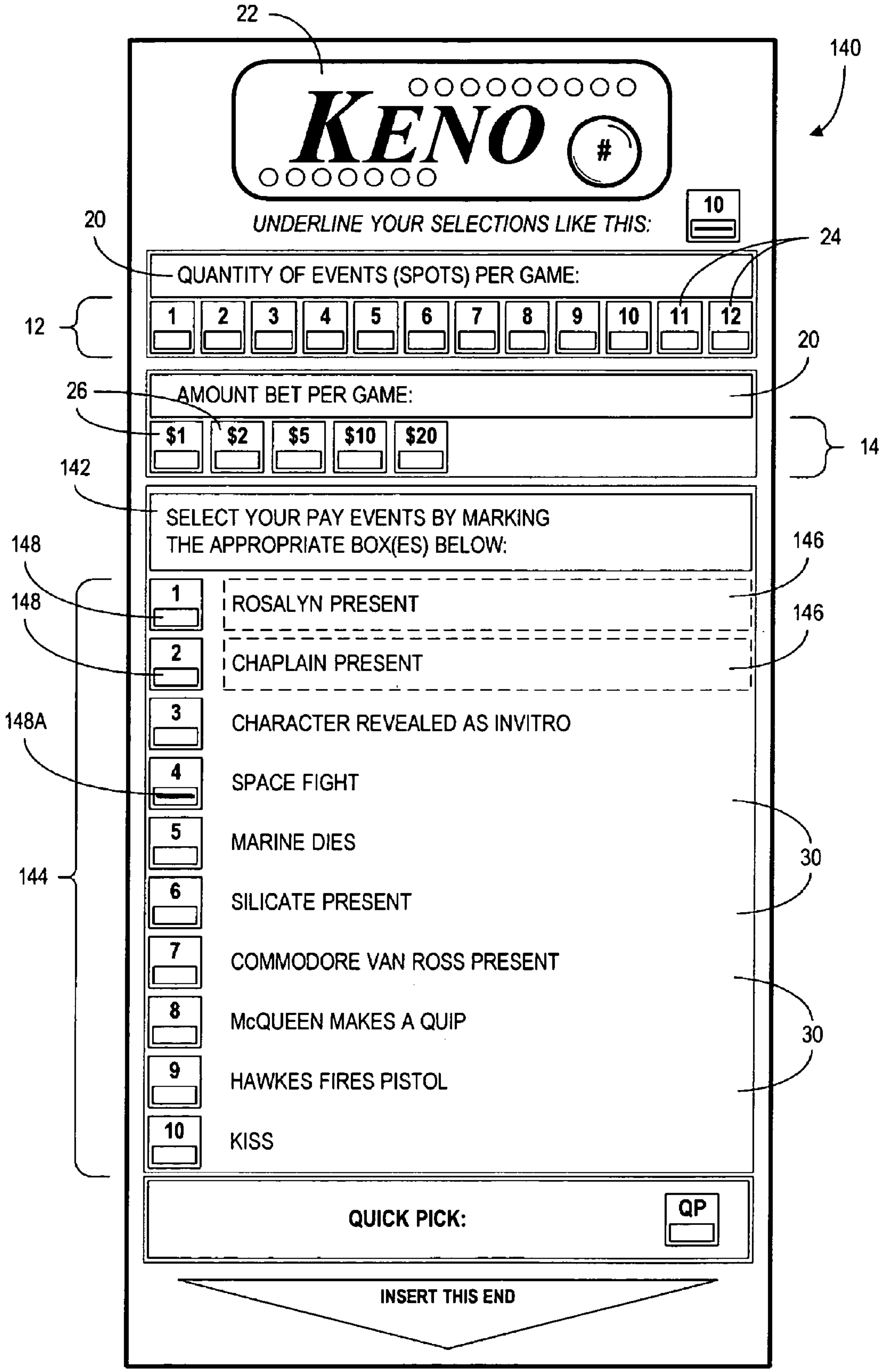
FIG. 9 illustrates an exemplary keno ticket according to an embodiment the present invention.

The keno player is likely to be oblivious to the manner in which the video content is created, edited, and delivered, and is much more interested in the end result: an exciting, dynamic, engaging keno game. To this end, the keno game establishment 130 installs or has installed site hardware 74 suitable for facilitating embodiments of the present invention on its premises and invites customers to partake of the keno game of the present invention. As illustrated in a flowchart in FIG. 8, the process of the game is as follows, interrupted by an explanation of the new elements in subsequent Figures. The keno player arrives at the keno game establishment 130 and secures a keno ticket 140 (block 150). The keno ticket 140 is illustrated in FIG. 9.

The keno ticket 140 is similar to the conventional keno ticket 10 with a few important differences. The keno ticket 140 may include a first field 12 and second field 14 with spot indicia 24 and bet indicia 26 respectively. The keno ticket 140 may also include instruction lines 20 and a logo 22. The logo 22 may be tied to the keno authority 70, to the video content around which the keno game is being played, a combination, or other logo as needed or desired. For example, the logo 22 could state "SPACE: ABOVE AND BEYOND™ KENO brought to you by ULTRAKENO!!!" or some such appropriately flashy and catchy logo. This logo or other indicia on the keno ticket 140 may indicate precisely which video content is covered by the keno ticket 140, including when the video content will be displayed, what channel, how long the video content will last, any repeat showings that may be made, or other information as needed or desired. Additional instructions on how to play, odds, payouts, and the like may also be provided.

In place of the fourth field 18 and number indicia 30, the keno ticket 140 has new instruction line 142, event field 144 and potential pay event indicia 146. The new instruction line 142 asks players to select potential pay events from those presented by the potential pay event indicia 146. The potential pay event indicia 146 indicate potential pay events in the keno game of the present invention. The potential pay event indicia 146 may refer to the potential pay events by their respective identifiers if appropriate, especially if the identifier is reasonably descriptive of the potential pay event. In the exemplary embodiment, the potential pay events of the guitar Rosalyn being present, the Chaplain being present, a character being revealed as an InVitro, a space fight, a marine dying, a silicate being present, Commodore Van Ross being present, McQueen making a quip, Lt. Hawkes firing a pistol, and a kiss are the potential pay events identified by the potential pay event indicia 146. While only ten potential pay events are illustrated, more or fewer may be present if needed or desired. In FIG. 9, the potential pay event indicia 146 are textual and readily ascertainable by the keno player. Braille indicia, alternate language indicia, or other ascertainable indicia are all within the scope of the present invention. While it is assumed in the previous discussion that the keno ticket 140 is paper or cardstock, the keno ticket 140 could take some alternate physical form such as a self-adhesive sticky note (e.g., POST-IT®), sticker, refrigerator magnet, or the like, or, as discussed later, an electronic form.

While keno ticket 140 is provided by way of example, variations on the form or content of a keno ticket are also within the scope of the present invention. For example, a third field 16 with game indicia 28 may be present; a quick pick option may be present; more or fewer instruction lines 20 may be provided; and the arrangement of the elements may be changed without departing from the scope of the present invention. Likewise, as will be discussed below, variations in the game may dictate variations in the keno ticket 140.

Figure 10:
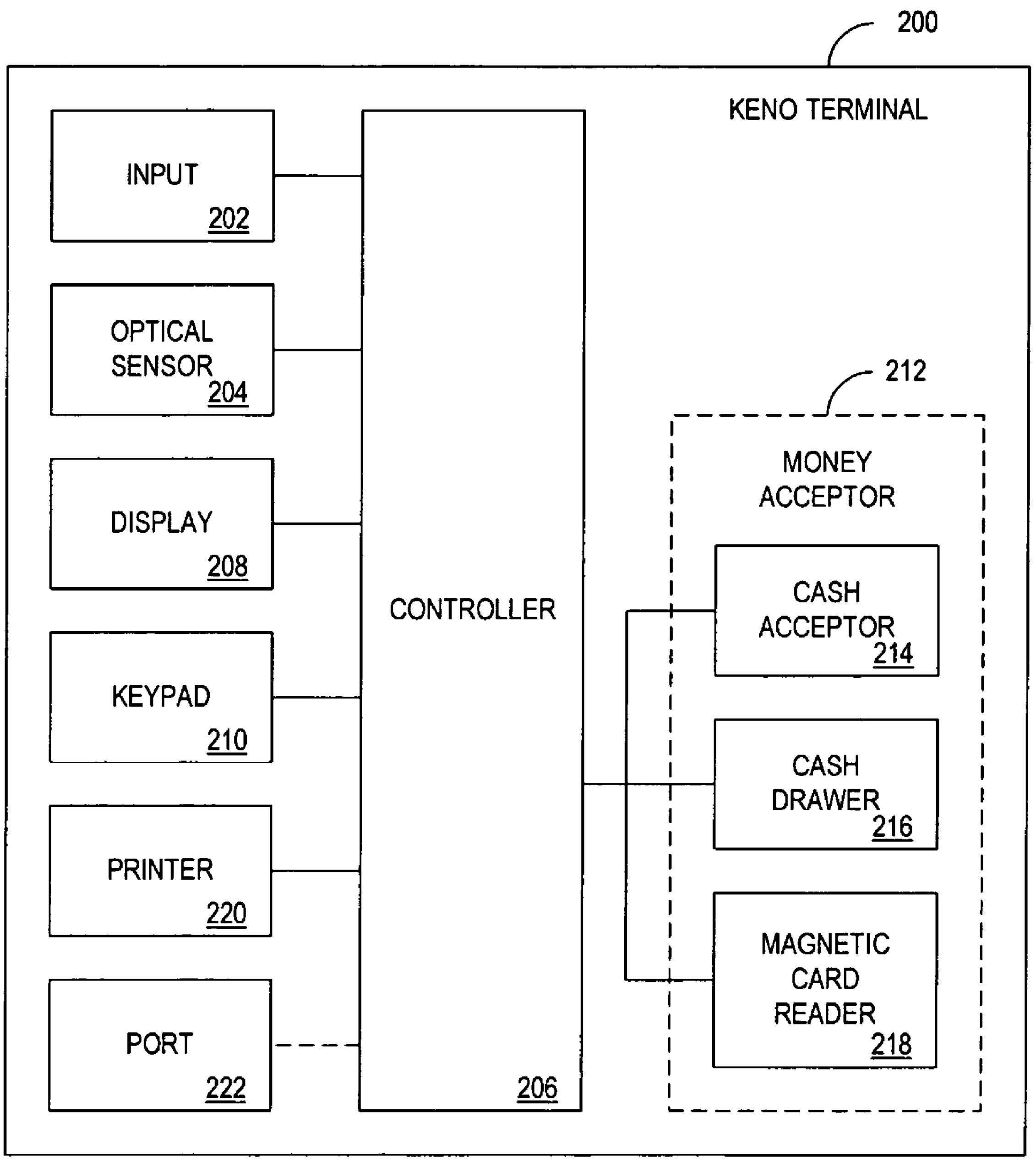
FIG. 10 illustrates as a block diagram an exemplary keno terminal according to an embodiment of the present invention.

The keno player selects pay events from the possible pay events identified by the potential pay event indicia 146 on the keno ticket 140 (block 152). This selection may be done in any number of conventional ways, but is, in an exemplary embodiment, effectuated by making a dark mark in the appropriate blocks 148 as illustrated by mark 148A (FIG. 9). The player then returns with the keno ticket 140 to the keno booth, and the keno game establishment 130 sells the keno ticket to the keno player (block 154). In an exemplary embodiment, the present invention uses a keno terminal 200 illustrated in block diagram format in FIG. 10.

The keno ticket 140 may be valid during only one showing. Alternatively, the keno ticket 140 may be valid for multiple video content showings. In one example, the multiple showings are components of multi-episode story arc or the like and the potential pay events are cumulative throughout the multiple episodes. In a second example, the keno ticket 140 may recite potential pay events generic enough to be valid across any episode of the video content. Time stamps or the like may determine on which episode the wager was made. Such generic pay events may be useful in situations where each game is played with different video content. For example, a player could fill out one keno ticket 140 for all the episodes in a season of a television series, where each episode forms a different game, but the player is wagering on the same potential pay events for each of the episodes. Alternatively, the keno ticket 140 may have separate columns with identical potential pay events for each of the episodes. This embodiment would allow the player to customize her wager for each episode, but space constraints on the keno ticket 140 may make this embodiment less practical.

The keno terminal 200 has an input 202 into which the keno ticket 140 is inserted. An optical sensor 204 reads the markings and indicia from the keno ticket 140 and provides this information to the controller 206. Information relating to the keno ticket 140 may be presented to the player and/or the keno attendant on a display 208 and the attendant may use a keypad 210 to provide additional information if needed or desired. The attendant may accept cash or other monetary input from the player with a money acceptor 212. The money acceptor 212 may be incorporated into the keno terminal 200 or be a separate cash register as needed or desired. The money acceptor 212 may be a cash acceptor 214, a cash drawer 216, a magnetic card reader 218, and/or another monetary acceptor/dispenser, as needed or desired. Once the controller 206 has verified the keno ticket 140 and payment has been indicated, the keno terminal 200 may regurgitate the keno ticket 140 through the input 202 (effectively making input 202 also an output, and thus occasionally the input 202 will be referred to herein as an input/output element) with appropriate markings to indicate that it has been sold, or a printer 220 may print a sold ticket as needed or desired. The printer 220 may dispense tickets from a pre-printed roll and/or may be a laser printer, thermal printer, dot-matrix printer, or the like as needed or desired. In embodiments where the printer 220 and the input 202 are present, collectively the two components may be considered an input/output element. The keno terminal 200 also includes a port 222 that allows communication with a remote location. The port 222 may be wireless or wirebased as needed or desired, and should be able to communicate with the keno authority 70 or other designated remote entity. As video content may be delivered through the port 222, a wideband port 222 better facilitates the present invention, but a narrowband port 222 would work where time elapsed during delivery is not an issue. In appearance, the keno terminal 200 may look like keno terminal 32 or it may be different having appropriate video content themed logos and the like to draw the attention of prospective players. If the keno terminal 200 is a self-service keno terminal, then the keno player may input his selections through an appropriate input (such as for example, making the display 208 a touch-screen display or through a keypad 210) and the printer may print the sold keno ticket with appropriate indicia (such as an equivalent to the indicia with mark 148A) thereon indicative of potential pay events selected by the keno player.

The sold keno ticket is provided to the keno player (block 156). While some in the industry refer to this process as providing a keno receipt or duplicate ticket, for the purposes of the present invention, providing a sold ticket to the player is intended to cover all these situations.

Figure 11:
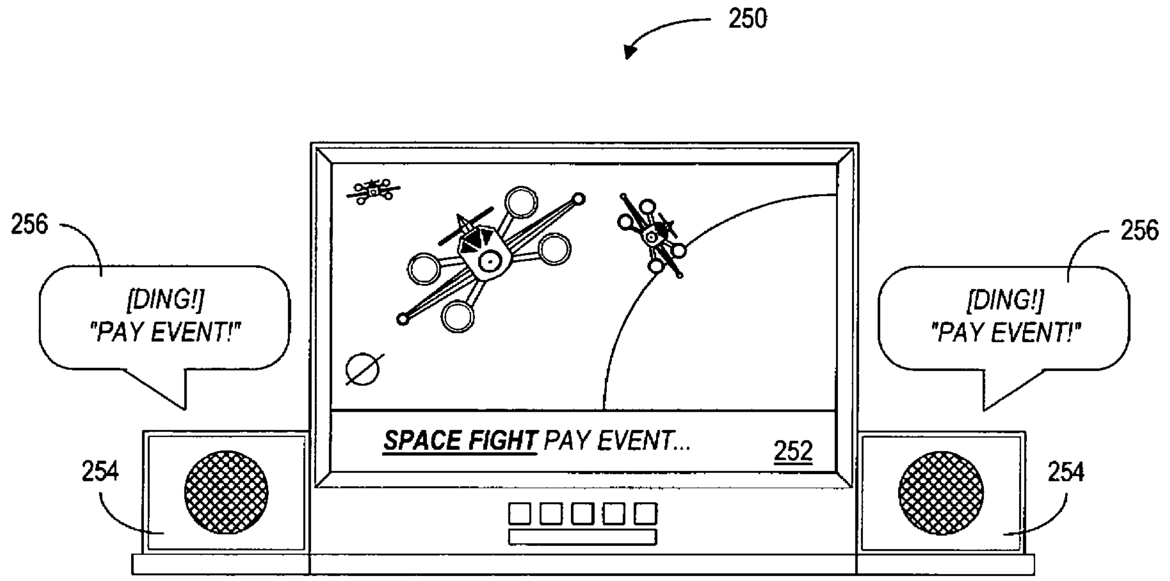
FIG. 11 illustrates video content being displayed on a keno monitor according to one embodiment of the present invention.
Figure 12A:
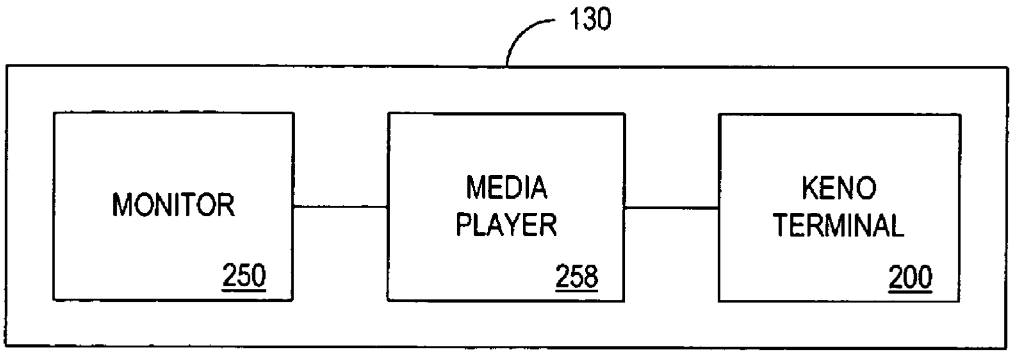
FIGS. 12A & 12B illustrate alternate video content storage options according to embodiments of the present invention.
Figure 12B:
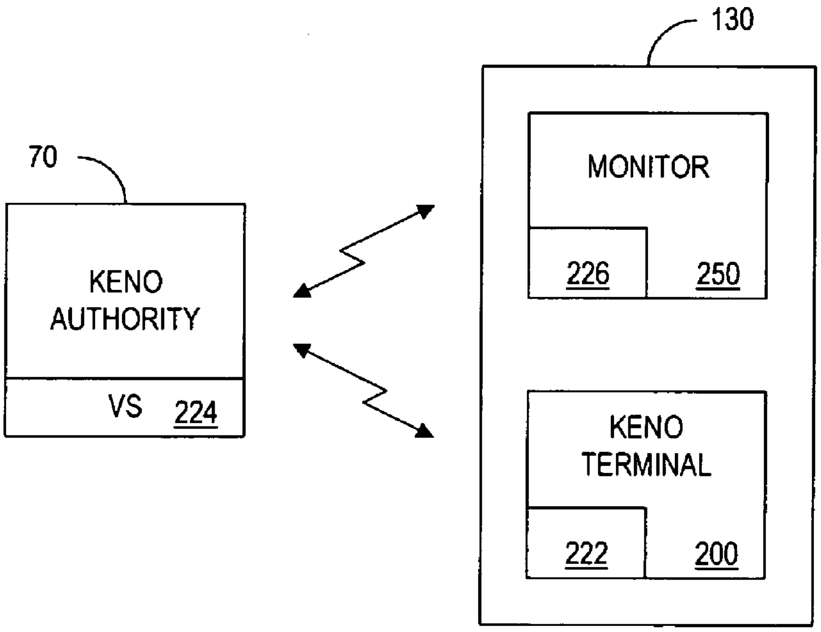

The keno game establishment 130 then displays the video content on a video monitor (block 158) such as video monitor 250 of FIG. 11. The video monitor 250 may be any appropriate monitor including a cathode ray tube (CRT) screen, a liquid crystal display, a plasma screen, a projection screen, or the like. Likewise, the size of the video monitor 250 is variable, but, in an exemplary embodiment, is a large screen monitor (greater than forty-six inches (~117 cm) diagonal) for easy viewing at a distance. The video monitor 250 may receive the video content from a number of different sources, two of which are illustrated in FIGS. 12A & 12B. In FIG. 12A, the video content is generated locally. In particular, the video monitor 250 is connected to a media player 258, which in turn is connected to the keno terminal 200, such as through the port 222. While it is expected that the video monitors 250 will be located throughout the keno game establishment 130, it is possible that it may be positioned in a dedicated movie theater and admission charged to the theater for patrons that do not have current keno tickets. It is possible that even current keno ticket holders could be charged for admission to the theater, but such may decrease the number of players as they may perceive that they are being charged twice to enjoy the video content.

As an alternative to the embodiment of FIG. 12A, the embodiment of FIG. 12B removes control of the video content from the keno game establishment 130 and vests such control more directly with the keno authority 70. The keno authority 70 may have a video server (VS) 224 in its central office 72 that stores video content thereon. This video server 224 may act as a video jukebox (such as the Pioneer DRM-3000 FlexLibrary DVD Jukebox) or the like as needed or desired. Keno authority 70 may arrange the video server 224 and other information in any appropriate format such as a database or the like. Keno authority 70 communicates with the monitor 250 and the keno terminals 200 through any suitable transmission medium compatible with the port 222. In an exemplary embodiment, the keno authority 70 broadcasts to the monitor 250 through a proprietary cable network. In such a case the port 222 may be a coaxial port. Alternatively, a wireless broadcast (terrestrial and/or satellite based) in which case the port is a wireless receiver, a proprietary or shared fiber optic network broadcast, an internet broadcast, or other medium based broadcast may be used if needed or desired each with a compatible input port for the keno terminals 200 and the monitors 250. Use of this embodiment may allow synchronized displays of identical video content at multiple locations. If the broadcast is made in some proprietary or specialized format or if the keno monitors 250 are "dumb", a set top box may be necessary to receive the video content from the video server. In such a case, the set top box may be part of the port or have its own ports.

At various times during the video content, potential pay events may occur in the content. Some or all of these potential pay events may be drawn pay events. When a drawn pay event is displayed, a cue is presented (block 160). The presentation of the cue may be concurrent with the drawn pay event or otherwise temporally close to the drawn pay event's display. As illustrated in FIG. 11, a space fight is occurring in the video content and is a drawn pay event. To this end, a pop-up cue 252 is visually presented to the players to alert them that this space fight is a drawn pay event. The pop-up cue 252 states "SPACE FIGHT PAY EVENT!" or the like. The phrase "Space Fight" is effectively an identifier for the pay event marked with a cue, and the cue includes the identifier. Likewise, speakers 254 may provide an audible cue 256 such as "*DING* PAY EVENT!" where the *ding* is a discrete bell tone or the like. While the example uses a descriptive identifier, as noted above, other identifiers could also be used. If potential pay events are similar, the identifiers may become important to help players distinguish between the potential pay events. For example, the potential pay event "Sonny shoots the criminal" compared to "Rico shoots the criminal" are similar. To help distinguish between the two potential pay events, the identifiers may be expanded to recite "Sonny shoots the criminal (EVENT #2347)" and "Rico shoots the criminal (EVENT #8974)". Variations in the type of identifiers used are within the scope of the present invention.

Note that it is possible that a particular segment of the video content may have multiple potential pay events occurring simultaneously. For example, if potential pay events are the presence of Chiggy Von Richtofen, a space fight, and the death of a marine, the instance where Chiggy Von Richtofen kills a marine in a space fight has all three potential pay events in the same segment of the video content. However, zero through three of these potential pay events may be drawn pay events and a corresponding number of cues would be used depending on how many of the potential pay events were drawn pay events. In other words, not every potential pay event is a drawn pay event. If a potential pay event is not a drawn pay event, the potential pay event will not be marked with a cue.

The video content concludes (block 162), and the players may evaluate whether their sold ticket has enough selected pay events to be a winning ticket according to the payout schedule of the particular keno game. The keno player takes the sold keno ticket to the keno booth or kiosk (or provides the sold keno ticket to a keno runner who does the same), and the keno game establishment 130 receives the sold ticket back from the keno player (block 164). The keno game establishment 130 then determines if the sold ticket just received is a winning ticket (block 166) by checking to see if the selected pay events of the ticket correspond to the drawn pay events that were marked with a cue in the video content.

In an exemplary embodiment, the keno game establishment 130 uses the keno terminal 200 to scan the sold keno ticket. The controller 206 then makes a determination as to whether the sold keno ticket is a winning ticket based on information available to the controller 206 and the information on the sold ticket. The keno terminal 200 may communicate with the keno authority 70 to assist in confirming the winning status of a ticket, or may make the decision locally as needed or desired.

If the sold keno ticket is a winning ticket, the keno game establishment 130 may account with the player (block 168) by providing a benefit or payout for the ticket from any suitable cash handling mechanism or benefit providing system. This sort of payout is appropriate for small dollar or low value benefit payouts. Larger value payouts may require the player to present the winning ticket directly to the keno authority 70 or have the proceeds mailed from the keno authority 70. Benefits may include, but are not limited to: money, products, services, coupons, gift certificates, entries into other games, tokens, chips, credits, and the like. The keno game establishment 130 may then account with the keno authority 70 (block 170) through any conventional mechanism. The accounting between the keno game establishment 130 and the keno authority 70 may include many sets of data, including but not limited to: keno ticket sales, data, including: an indication that a sale has been completed or canceled, what pay events (and/or numbers) were selected for a certain ticket (either by the player or otherwise), what video content was selected for a certain ticket, summary of the number of tickets sold, summary of payouts or benefits given, payouts or rewards passed to the keno authority 70 to redeem (in those instances when the reward is higher than the keno game establishment 130 is authorized to pay or is capable of paying based on current amounts in the till), and the like. In an exemplary embodiment, a wire transfer is effectuated between the keno game establishment's bank and the keno authority 70 once per video content playback, once a day, once a week or other period as needed or desired. Alternatively, a check may be drafted periodically from the keno game establishment 130 to the keno authority 70. The timing of the payments and the reports is not critical to the present invention and other variations on this accounting are also contemplated and within the scope of the present invention.

Setting aside the accounting between the keno game establishment 130 and the keno authority 70, it is readily apparent that the use of video content which has certain potential pay events marked with a cue to designate drawn pay events is more exciting and provides greater entertainment opportunities relative to the conventional static keno monitors 54. Given the breadth of subject matter from which the video content may be drawn, it is probable that video content for any audience may be found to support the video based keno game of the present invention. However, the present invention has numerous variations in how it may be implemented.

The first variation is in the nature of the interaction between the keno player and the keno game establishment 130. As alluded to above, rather than rely on the keno player approaching a keno booth, the keno player may use a self-serve keno kiosk to purchase and redeem keno tickets, but may still use a monitor 250 to watch the video content. As yet another alternative, the keno player may interact with a keno runner to purchase and redeem keno tickets. The keno runner could, in some embodiments, be a waitperson, hostess, host, maitre d'hotel, dedicated keno runner, or the like. The level of service provided by the runner could vary along a continuum. In the simplest embodiment, the runner may just act as a physical courier between the keno player and the keno booth. Thus, the keno runner could provide keno tickets 140, allow the player to mark the keno ticket 140, take the marked keno ticket 140 to the keno booth with the player's wager, return with the sold keno ticket, return winning tickets to the keno booth, and return winnings to the keno player. Alternatively, the keno runner could be equipped with a portable keno terminal and act as a mobile keno booth.

Figure 13:
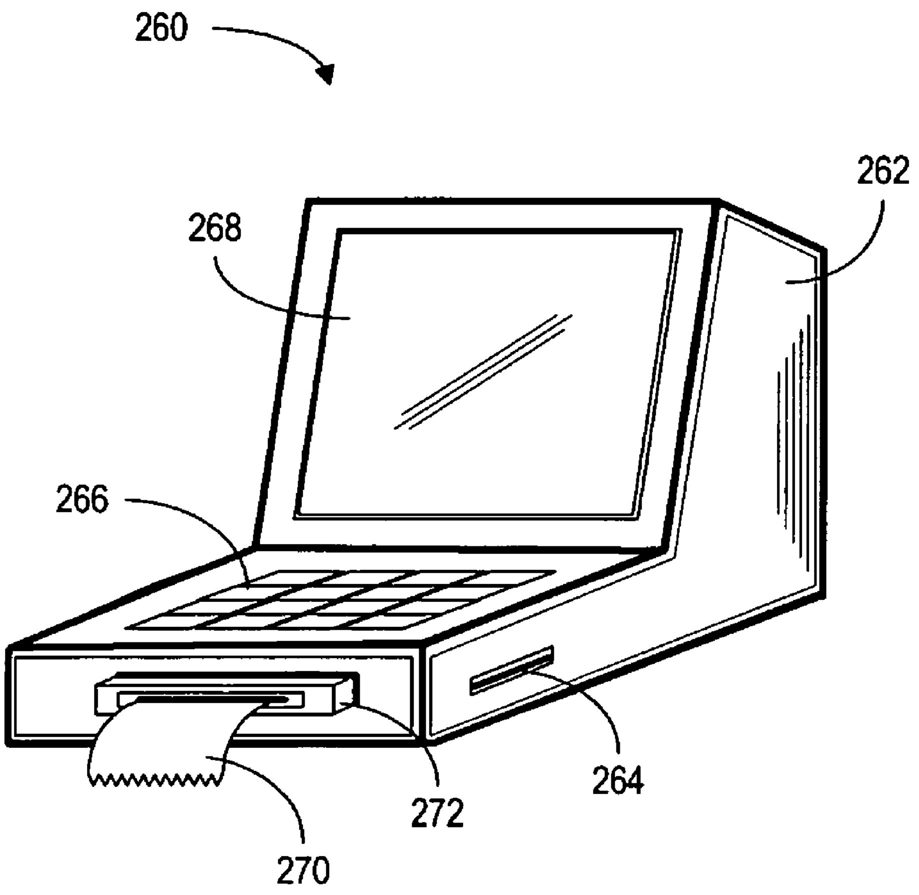
FIG. 13 illustrates an embodiment of a portable keno terminal suitable for use by a roaming keno attendant.

One exemplary portable keno terminal 260 is illustrated in FIG. 13, which has a housing 262 analogous to a personal digital assistant (PDA). The housing 262 delimits an input 264, which may allow a keno ticket 140 marked by the player to be inserted therein and scanned. Alternatively, a keypad 266 may be used to enter data conveyed to the keno runner. That is, the player could recite her choices, and the keno runner could type them in as the player speaks or the keno runner could read a keno ticket 140 and enter the player's choices manually. A display 268 may be used to view the input data, and a printer 272 may be used to print a sold keno ticket 270. Display 268 may be a touch screen allowing elimination of the keypad 266 if desired. Small portable printers are well known in the industry as evidenced by the printers (like the ABC PP-50) that are available for a PALM III and SPT 1500. Thus, a specially programmed PDA might readily accommodate this embodiment. Portable keno terminal 260 is well suited for use by a waitperson or the like that is used to handling money and orders separately and concurrently. The keno runner may then synchronize her portable keno terminal 260 through any conventional technique and account with the keno game establishment 130 much as a waitperson does. This embodiment is particularly well suited for a bar establishment where the waitperson doubles as a keno ticket salesperson, and people play Keno over drinks and food while watching their preferred video content on the video monitors 250 around the bar.

Figure 14:
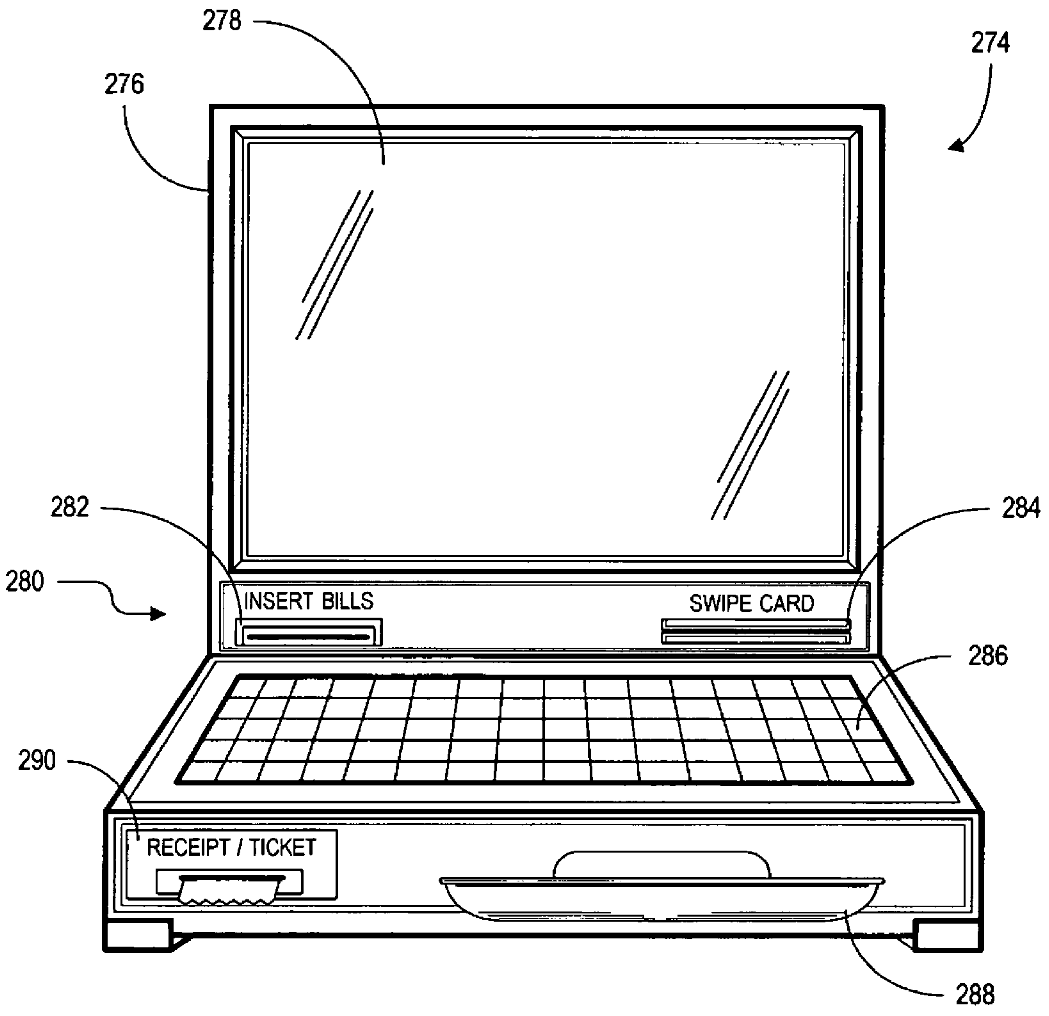
FIG. 14 illustrates an embodiment of a keno terminal incorporating a video content display.

Another alternate embodiment is that the keno player may watch the video content on the keno terminal rather than on a separate keno monitor 250, effectively combining the keno terminal 200 and the keno monitor 250. An exemplary self-serve combination keno terminal 274 is illustrated in FIG. 14. The self-serve combination keno terminal 274 may include a housing 276, which may be a table top structure (not shown), a cabinet structure (shown), a wall-mounted unit (not shown), or the like as needed or desired. The housing 276 includes at least a display 278 on which video content may be displayed. Payment acceptors 280 may be mounted in any convenient location on the housing 276 or in networked peripheral devices (not shown). In an exemplary embodiment, cash acceptor 282 and/or a magnetic card reader 284 are mounted on the housing 276 and function as is well understood. A keypad 286 may be used to provide inputs to the self-serve combination keno terminal 274. For example, prior to the beginning of game play, instructions could be presented on the display 278 and the keno player could provide input to start the game play through the keyboard 286. Alternatively, the display 278 may be a touch screen display and input may be provided directly through the display 278, in which case the keyboard 286 could be eliminated. Once the keno player has selected her potential pay events and placed her wager using the payment acceptor 280, the video content is then presented on the display 278. The keno player may sit on a nearby chair or couch and watch the video content. If the keno player has made a winning selection, the payout may be provided through a hopper 288 or through a cashless receipt printed by printer 290. Alternatively, the printer 290 could print a sold keno ticket that the keno player then takes to a keno booth after the video content has concluded. The keno ticket for the self-serve combination keno terminal 274 may be an electronic ticket only viewable on the display 278, or it could be printed by the printer 290 prior to the presentation of the video content.

Video content for the self-serve combination keno terminal 274 may be stored locally on a hard drive, DVD jukebox, or other memory device as needed or desired. Alternatively, the video content may be stored at the video server 224 of the keno authority 70 and selectively broadcast to the self-serve combination keno terminal 274 on demand through any appropriate communication link as previously described. Though not illustrated, the self-serve combination keno terminal 274 has a processor or controller that controls operation of the self-serve combination keno terminal 274 and, if needed, a receiver to receive the video content from the video server 224.

While the self-serve combination keno terminal 274 is illustrated as a reasonably large cabinet style terminal, other configurations are possible. For example, the self-serve combination keno terminal 274 could be a portable device comparable in size and shape to a portable DVD player. In such an embodiment, the keno player could make a wager at a keno booth, receive a sold keno ticket, check out the portable keno terminal with appropriate video clip stored therein, and then watch the video content at her leisure, returning the keno terminal concurrently with collecting any winnings. Security measures such as those used in retail and library establishments or those disclosed in U.S. Patent Application Publication No. 2002/175818, which is hereby incorporated by reference in its entirety, may be incorporated into the player and/or the video clip.

Figure 15:
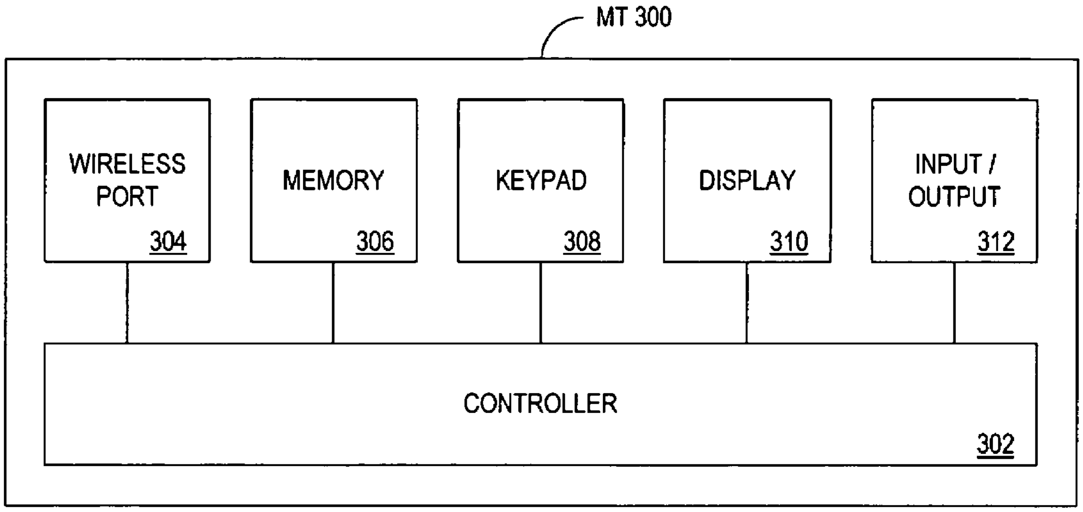
FIG. 15 illustrates an exemplary mobile terminal suitable for use with at least one embodiment of the present invention.

As yet another portable option, the keno player could download operative software to her own mobile terminal such as a PDA, cellular phone, wristwatch, alphanumeric pager, DVD player, laptop computer, or the like. An exemplary mobile terminal 300 is illustrated in FIG. 15 and includes controller 302, which is, in an exemplary embodiment, a microprocessor. Mobile terminal 300 also includes a wireless port 304, memory 306, keypad 308, and display 310. Other input and output (I/O) devices 312 may also be present. The wireless port 304 may be an antenna and a transceiver adapted to operate in any wireless protocol, including, but not limited to Bluetooth, GSM, EDGE, CDMA, WCDMA, AMPS, D-AMPS, 802.11, and the like. Alternatively, the wireless port 304 may be an optical, infrared, or other frequency port or the like as needed or desired. The display 310 is adapted to present video content to the user. The keypad 308 may be a numeric ten digit plus * and # pad, an integrated touch screen, or a full alphanumeric keypad as needed or desired.

Figure 16:
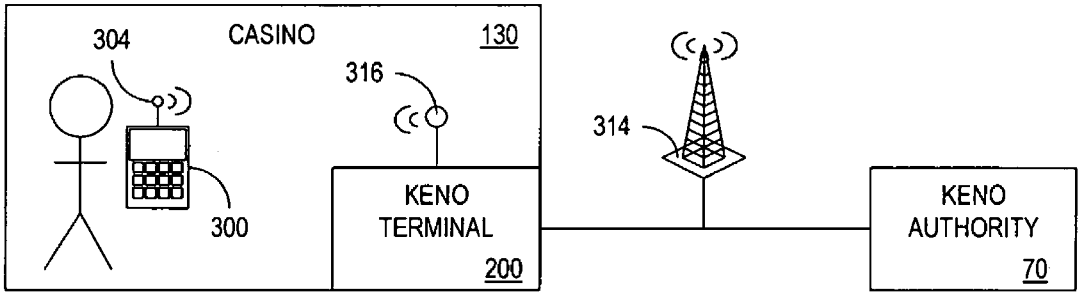
FIG. 16 illustrates an exemplary mobile terminal operating as a keno terminal according to one embodiment of the present invention.

In practice, the user takes the mobile terminal 300 to a keno game establishment 130 (or other location from which a connection to the keno game can be made). The mobile terminal 300 may communicate with the keno authority 70 directly through a cellular network 314 or indirectly through a wireless network 316 associated with the keno terminal 200 (or other site hardware) as illustrated in FIG. 16. In either case, the user may log in to the keno authority 70 and secure permission to play keno on her mobile terminal 300. The log in process can be any sort of traditional login process, such as that commonly found in hotels or FEDEX/KINKO stores that provide Wi-Fi access. The user may initially pay a fee to download the software or fund a wagering pool, or alternatively, the fee may automatically be applied to a wireless account associated with the mobile terminal (much like making a 1-900 call on a cellular phone). Once the log in is complete, the user may download the software that enables the controller 302 to conduct keno games on the mobile terminal 300. The downloading can take place through the cellular network 314 or wireless network 316 as needed or desired. Alternatively, the keno game establishment 130 may provide docking ports in which the mobile terminal 300 may dock and download the software.

Having downloaded the software, the user may then make a wager on potential pay events through the software using a prefunded account, her mobile terminal's wireless account, or by providing credit card or other account information to the keno authority 70/keno game establishment 130. Instead of filling out a keno ticket 140, the keno ticket may be presented electronically to the user on the display 310 and the user may make selections through the keypad 308 or other input device much like in a self-serve combination keno terminal 274. Depending on the sophistication of the mobile terminal 300, various drop-down menus and graphical or textual user interfaces may be appropriate to facilitate the player's interaction with the mobile terminal 300 in this keno-playing mode. In a first embodiment, the operative software is a thin client, and the mobile terminal 300 is driven by the server either at the keno game establishment 130 or the keno authority 70. In a second embodiment, more robust software is downloaded to the mobile terminal 300 and the controller 302 controls the keno game. The risk of hacking the software in the second embodiment may make such an embodiment less desirable unless appropriate security measures are in place. Once the wager is made, the video content could then be broadcast to the mobile terminal 300 from the cellular network 314 or the wireless network 316. Alternatively, the video content may be downloaded concurrently with the software and stored in memory 306 until the wager is completed. For security purposes, the software and/or video content may have an expiration date after which it self-deletes or is otherwise rendered inoperative. While the above discussion focuses on a cellular type embodiment, it is possible that other devices may be equally or better suited for such activity. For example, the IPOD™ by APPLE® would allow similar sorts of functionality with downloaded video podcasts. As discussed in greater detail below, online video content based keno is also within the scope of the present invention, and the mobile terminal 300 could use such a system as described below.

In some embodiments, instead of downloading software to the mobile terminal 300 (whether it be a cellular phone, IPOD, or other device) and making the wager through the mobile terminal 300, the player may approach a keno kiosk or terminal 200 and make a wager through the keno kiosk, then the player may dock (or otherwise communicatively couple) the mobile terminal 300 to the keno terminal 200 and have the video content downloaded to the mobile terminal 300. The keno terminal 200 stores the player's selected pay events and the wager along with a player identifier and a video content identifier. The video content with the drawn pay events marked by a cue plays on the mobile terminal 300, and the player returns to the keno terminal 200 to recover her benefit earned (if any). In this embodiment, the only keno ticket is an electronic keno ticket kept by the keno terminal 200 and the only function of the mobile terminal 300 is as a playback device. This embodiment may improve security in the wagering process and placate keno game establishments 130 because the player has to visit the keno game establishment 130 to initiate play.

As yet another embodiment, the video based keno game of the present invention may be moved out of the traditional keno game establishment 130 and implemented almost anywhere a monitor can be found. For example, just as a person can order video on demand on their hotel room or home television, a keno player could order video based keno games on demand. The player's input may be accepted through the television or set top box remote control and the television could act as a proxy self-serve combination keno terminal. The wager could be billed to their hotel room or television content provider bill. The user could use any user interface to make menu selections from a menu presented on the display of the television. Alternatively, like some of the DIRECTTV® installations, the set top box may use a phone line to communicate selections from the set top box to the content provider. The wager will show up on the provider's bill just like a pay per view purchase. Payouts could appear as credits on the same bill in the same manner.

Instead of ordering content through a set top box, the player might instead wager in a keno game establishment 130 and then receive a video clip that can be played back at a later time on a media playback device. For example, the keno game establishment 130 might provide the player with a CD or DVD with edited video content thereon. The player's wager is stored with the keno game establishment 130 at the time the video clip is provided. The player watches the video clip on her own playback device at her leisure and returns to the keno game establishment 130 with the video clip and their original keno ticket 140 for any earned benefit. Again, the video clip may have some mechanism for self-expiring. Alternatively, the video clip may only play in authorized devices. For example, as disclosed in U.S. Patent Publication No. 2004/0054594, which is hereby incorporated by reference, it is possible to make a disc that is only playable in the presence of a particular interrogation signal. Thus, the player could only play the video clip on such a disc in an authorized playback device. In still another embodiment, the video clip may be accompanied by software that acts as a client for the keno authority 70 and allows wagers to be made through the software and edited video content to be played from the video clip or sent from the keno authority 70 to the player.

Figure 17:
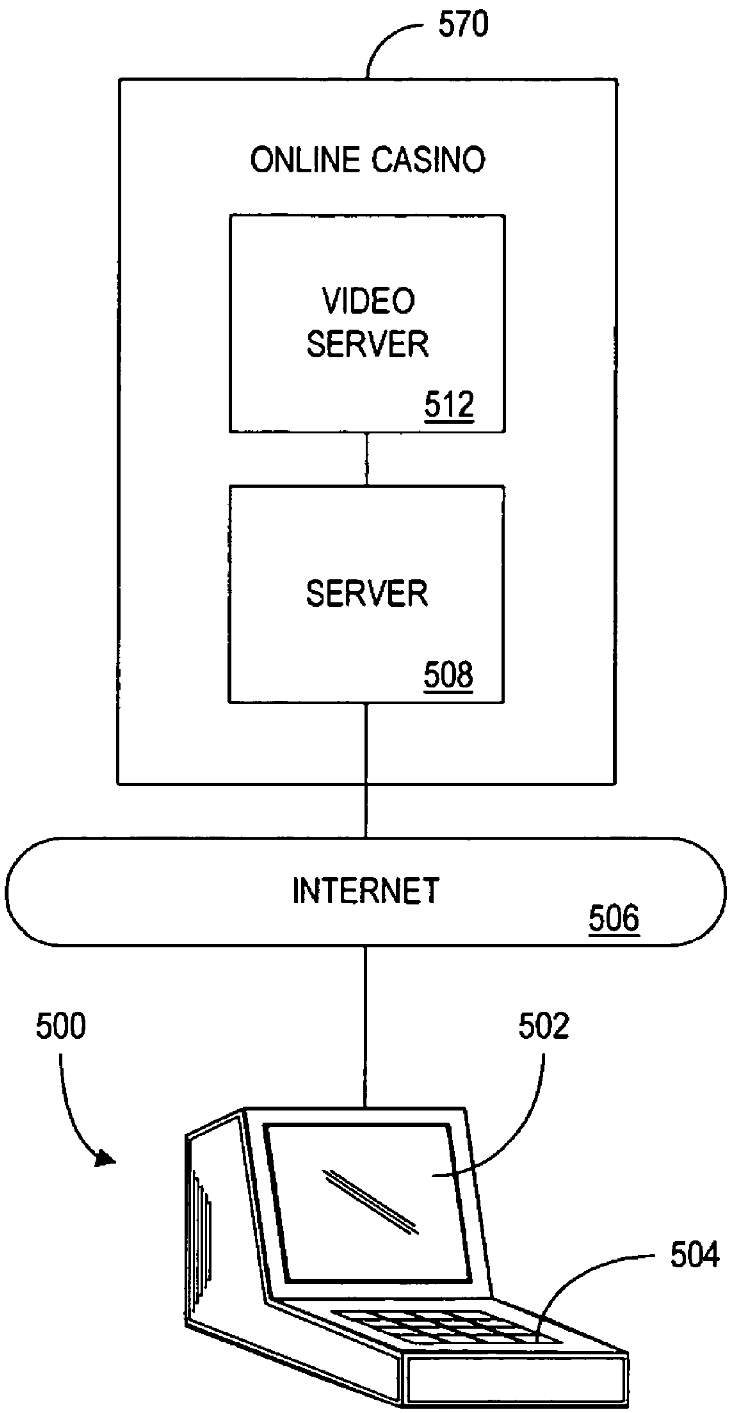
FIG. 17 illustrates an online video based keno game according to an embodiment of the present invention.

As yet another variation of the present invention, the present invention may be adapted to an online casino type presentation as illustrated in FIG. 17. A keno player uses a computer 500 equipped with a display 502, a keyboard 504, and internet access (not shown explicitly) to access the internet 506. The computer 500 has browser software such as Internet Explorer™, Netscape Navigator™, Mozilla, or the like installed on the computer and the keno player directs the browser to an appropriate online casino website by providing the browser with a uniform resource locator (URL) in the address line of the browser user interface. The online casino website may be hosted by a sever 508 associated with the online casino 510. The keno player may have to go through an appropriate log in and proof of age process as is well known. The keno player navigates through the website in a conventional web navigation manner and selects a video based keno game. The player may select from a menu of possible video content or the online casino 510 may dictate that certain video content is available at certain times. Either way, the player is presented with an electronic keno ticket or other mechanism through which the player may place a wager relating to the upcoming video based keno game. In an exemplary embodiment, the player may have an online balance associated with the online casino and wagers are deducted from and payouts are credited to this online balance. Once the wager is accepted, a video server 512 may stream video content to the computer 500 through the internet using appropriate video streaming technology as is well understood in the industry. Drawn pay events are marked with a cue during the presentation of this streaming video, and the player can compare her selected pay events to the drawn pay events as previously described. Likewise, the server 508 or other controller of the online casino may determine if the player's wager is a winning wager. If the player has selected enough drawn pay events to have a winning ticket, the online casino may credit the online balance.

In addition to variations in playback locations, there are numerous variations in how the keno tickets can be sold. In particular, it is possible that keno players will be familiar with the video content and may attempt to use this a priori knowledge to assist in selecting the potential pay events on which their wager is based. Thus, a player could know that the episode "The Angriest Angel" featured Chiggy Von Richtofen, the death of a marine, and a space fight and wagers on those potential pay events. To prevent the player's a priori knowledge from being used to win, the keno terminal 200 may randomly assign selected pay events to the keno player when the keno player purchases the keno ticket. In effect, every ticket becomes a quick pick keno ticket, and no player can use any a priori knowledge to select potential pay events. The controller of the keno terminal 200 or the server 508 of the online casino 510 may make this random selection, or if the keno terminal 200 is a dumb terminal, the central office of the keno authority 70 may make the random selection and provide the appropriate instruction to the keno terminal 200.

Figure 18:
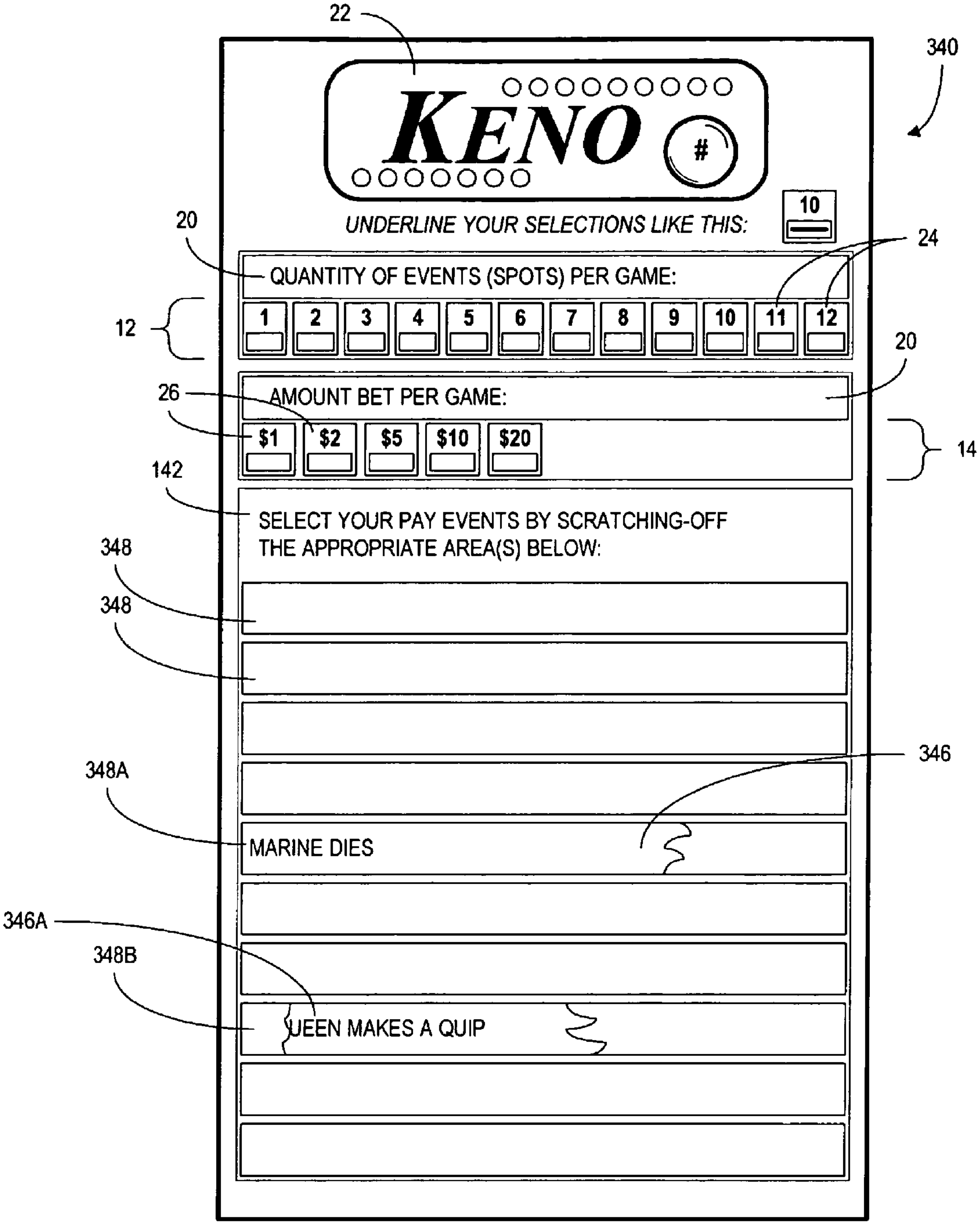
FIG. 18 illustrates an alternate embodiment of a keno ticket according to the present invention.

As a permutation of the random selection of pay events on the keno ticket, the keno ticket could instead be a scratch off keno ticket as illustrated in FIG. 18, which illustrates such a scratch off keno ticket 340. Many elements are similar to the previously described keno ticket 140, but in place of potential pay event indicia 146, the potential pay event indicia 346 are obscured by conventional latex composite scratch off covering material 348. A player takes a coin, eraser, or fingernail and scratches off the covering material over the selections, revealing indicia 346. In FIG. 18, enough of material 348A has been removed to reveal fully the indicia 346 and only part of the material 348B has been removed revealing a fragment of indicia 346A. Such partial scratch offs are likely to be considered full scratch offs. The player effectively chooses how many events on which the wager is based on the number of scratch offs the player makes.

In place of the latex composite scratch off covering material 348, an adhesive could be used to secure obscuring material over the potential pay event indicia 346 and the player could peel off the obscuring material to reveal the indicia 346. In either case, the player may be instructed to not remove the obscuring element until indicated by the video content (e.g., right before the killer's identity is revealed). This embodiment may add suspense to the game, making it more attractive to certain types of players.

Because the player does not know what indicia 346 lies under the material 348 (or other obscuring material), the player cannot use a priori knowledge to affect the outcome. Likewise, some players may be attracted to the game by the scratch off keno tickets as evidenced by the popularity of scratch off lottery tickets.

Figure 19:
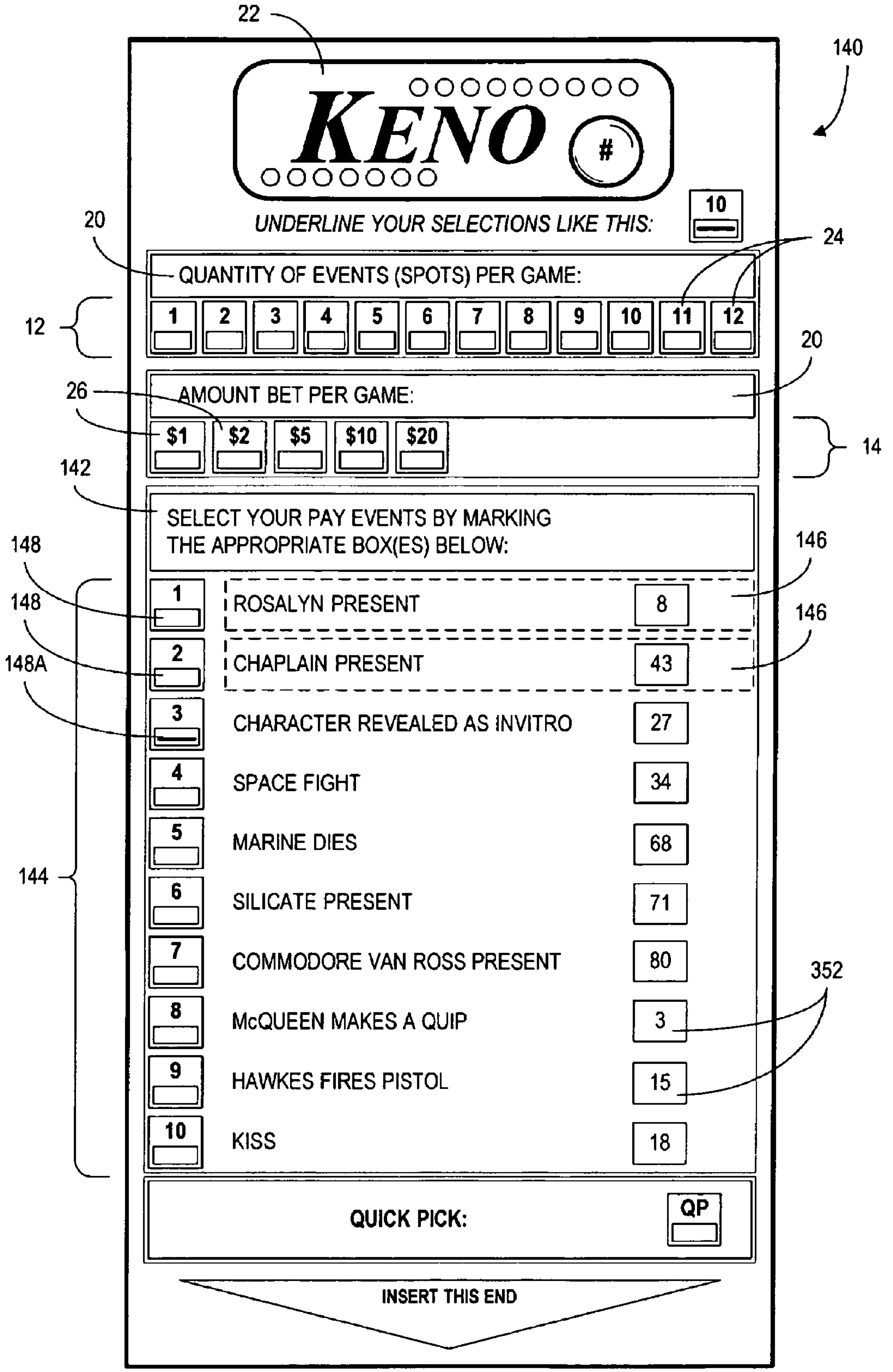
FIG. 19 illustrates another alternate embodiment of a keno ticket according to the present invention.

As yet another embodiment, and to help the more conservative keno players become accustomed to a video based keno game, the potential pay events of the keno ticket may be associated with a number. For example, as illustrated in FIG. 19, the keno ticket 350 looks similar to the keno ticket 140, but with the addition of number indicia 352 in association with each of the potential pay event indicia 146. In a first embodiment, every keno ticket 350 has the same number indicia 352 associated with the same potential pay event indicia 146. Thus, in the exemplary embodiment, every ticket 350 would have "ROSALYN PRESENT 8". The cues of the present invention may indicate not only a pay event, but also the number associated with the pay event. For example, the space fight of FIG. 11 may have the cue: "SPACE FIGHT! PAY EVENT 34!" A player wins in this embodiment by matching enough selected pay events with the drawn pay events. The player may refer to the pay event indicia or the number to determine if there is a match. At the end of the game, an auxiliary monitor (not shown) or the keno monitor 250, or the display 278 could show a summary or history of the drawn pay events and the numbers associated therewith much like a traditional keno monitor 54 shows numbers. Instead of the tabular form of keno monitor 54, the numbers could be shown in a ticker format or other format along with advertisements or a count down to the beginning of the next game. Note that this sort of summary of historically drawn pay events may be available in other embodiments, albeit instead of just the numbers, the pay event indicia 146 (with or without the numbers) may be presented. Further note that it is also within the scope of the present invention that such historically drawn pay event information may be available on an auxiliary monitor, keno monitor 250, display 278 or other monitor as a ticker, header, footer, sidebar, or the like for this and the other embodiments.

Figure 20A:
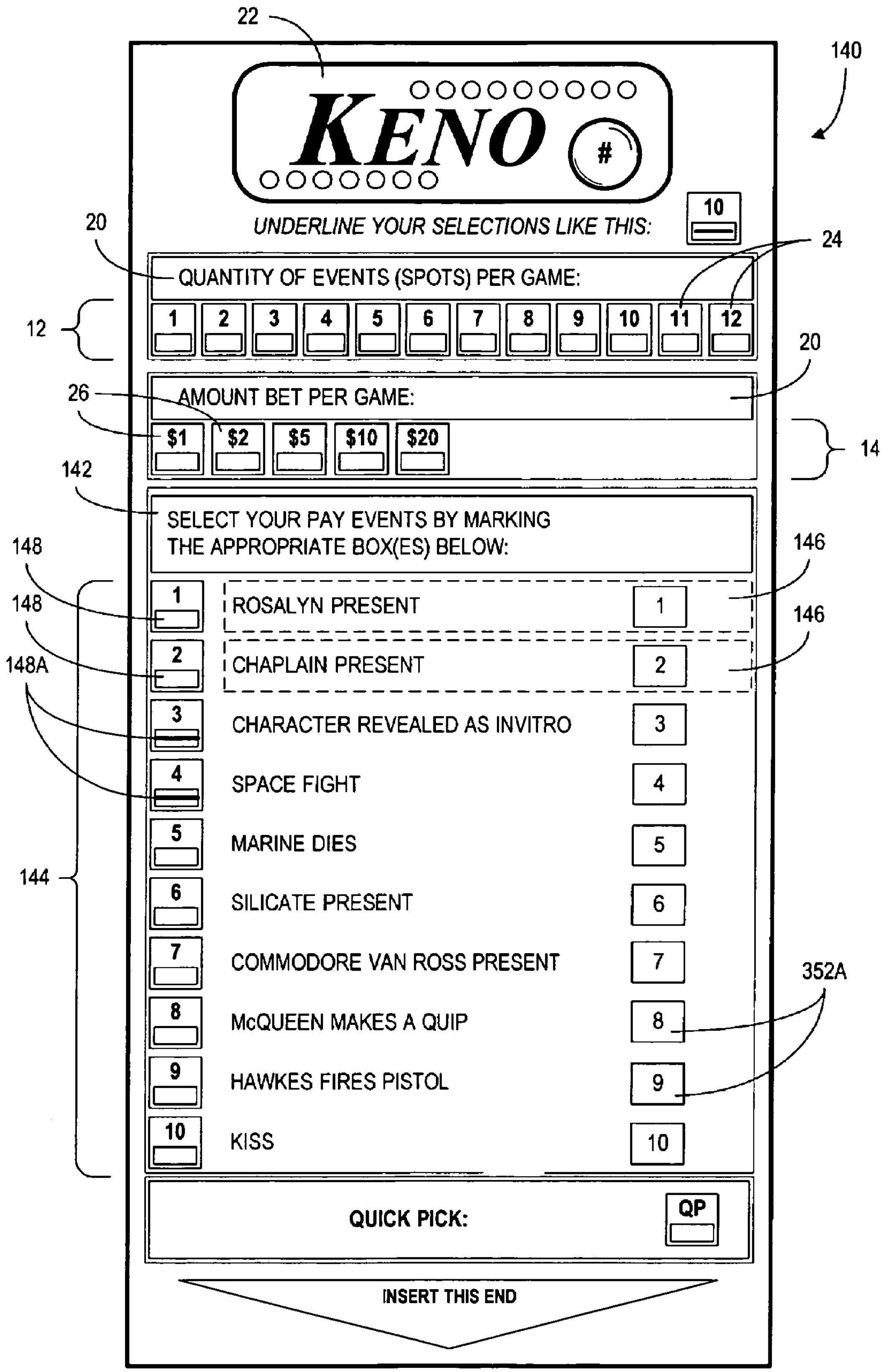
FIGS. 20A & 20B illustrate still another alternate embodiment of a keno ticket according to the present invention.
Figure 20B:
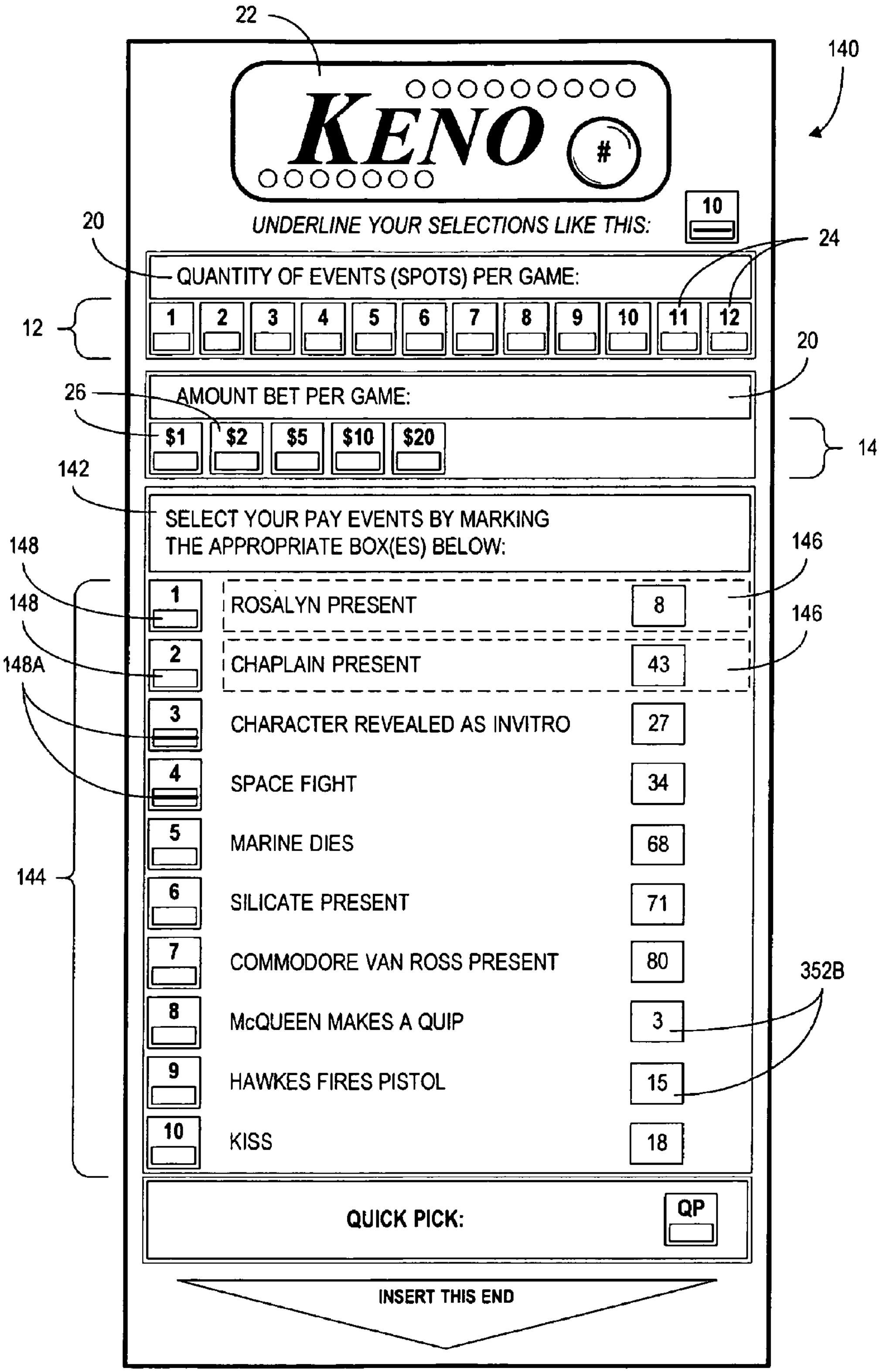

As an alternative to the embodiment of FIG. 19, the number indicia may vary from ticket to ticket. Thus, as illustrated in FIGS. 20A & 20B, the same potential pay events 146 have differing number indicia 352A & 352B. For the player to have a match, the player must not only match the drawn pay event, but also the number of the drawn pay event. Thus, in the example where the cue states "SPACE FIGHT! PAY EVENT 34!" only the ticket of FIG. 20B would have a match. Even though the player of the ticket of FIG. 20A marked the space fight potential pay event, the mismatch on the number makes the ticket of FIG. 20A a loser. If later there is a pay event with the cue "MECHANIC IS AN INVITRO! PAY EVENT 5" neither ticket is a match, even though both have selected the potential pay event of: CHARACTER IS REVEALED AS AN INVTRO. In this embodiment, the identifier used in the cue is important to help differentiate between possible pay events.

This embodiment also helps combat a priori knowledge by introducing the added complexity of matching the numbers. Thus, even if a player knows that a potential pay event will occur in the video content, the player does not necessarily know what number will be associated with the potential pay event.

As alluded to earlier, the uncertainty factor can be further heightened by randomizing which of the potential pay events in the video content are drawn pay events. Thus, if a video clip has eighty potential pay events in its video content, perhaps only twenty of the potential pay events will be drawn pay events and marked with a cue according to the present invention. That way, even if a player knows that a potential pay event occurs in particular video content, the player is not guaranteed that the potential pay event is a drawn pay event. In a first embodiment of this variation, the drawn pay events are static from presentation to presentation of the video content. That is, if episode five of SPACE: ABOVE AND BEYOND™ has a certain set of drawn pay events and cues in its first showing, then subsequent showings will have the same drawn pay events and cues. This variation is obviously open to some abuse if players can determine when and where the next showing of that video content will be held. To combat this potential abuse, a second embodiment varies which of the potential pay events are drawn each time the video content is displayed.

In keeping with the last variation, there are variations in which the drawn pay events are selected from amongst the potential pay events. In a first embodiment, and as described above, the video editor makes the decision as to which of the potential pay events are drawn pay events. This arrangement is suitable when the drawn pay events are static and will not change from showing to showing. In a second embodiment, the keno authority 70 receives the edited video content with tags or other information identifying potential pay events, and the keno authority 70 makes the decision. The keno authority 70 provides an auxiliary information file identifying which tags within the video content indicate drawn pay events. The keno authority 70 then delivers the edited video content with the auxiliary file such that when the two are used by a keno game establishment 130, the appropriate cues are presented on the keno monitor 250 (or other keno terminals such as the hotel room television, the mobile terminal, or the like) for a single showing. This embodiment is well suited for content delivery from a video server 224 at the keno authority 70 to dumb keno terminals 200. When a second showing is desired, the keno authority 70 makes a new random selection of drawn pay events from amongst the set of potential pay events and redelivers the auxiliary file to the keno game establishment 130 (or other keno terminal as previously mentioned). This embodiment ensures a great deal of control by the keno authority 70 over the content and the drawn pay events.

As still another embodiment, the keno game establishment 130 may make the decision as to which of the potential pay events are drawn pay events. In this embodiment, the site hardware for the keno game establishment 130 selects the drawn pay events and inserts the appropriate cues when the tags occur during presentation. A variation of this is prompted by the variations in the keno terminal possibilities. That is, for hotel television viewing, the set top box or television acts as a keno terminal, in which case the step top box may have a controller or processor that is capable of making the decisions as to which of the potential pay events are going to be drawn pay events.

As still another embodiment, the video content may be edited to include the tags and/or cues later in the process or the editing and delivery process may be expanded to include live events. For example, someone or something at the keno game establishment 130 could receive a broadcast of video content from a remote location and could identify drawn pay events on the fly much like close captioned text is created on the fly for live broadcasts. If the video content is being supplied to a hotel television or other self-service combination keno terminal, then the set top box or other receiver could perform this on the fly editing. Obviously, there may be some issues about impartiality if a human editor performs the drawn pay event selection and programming, so pattern recognition software could be used with the video content to help identify potential pay events and insert the appropriate cues for drawn pay events. Alternatively, instead of pattern recognition software, an audio threshold software mechanism could be used to detect audio track volume thresholds and designate pay events based on the volume exceeding this threshold. Thus, fights and laugh tracks would likely be designated as potential pay events because such events are likely to have higher volumes associated therewith. Alternatively, if the audio level fell below a certain threshold, that fact could cause the software to designate a potential pay event. For all the editing, the editing can be manual (as is generally assumed throughout the preceding examples) or automatic, such as by companies like Sportvision of 4169 North Ravenswood, Suite 304, Chicago, Ill. 60640 or Princeton Video Imaging of 561 Seventh Avenue 4$^{th}$ Floor, New York, N.Y. 10018.

For automatic editing, the editing can be performed by a controller at the keno authority 70, the keno terminal 200 or 242, the video server 224, a set top box acting as a keno terminal, or other intermediate location as needed or desired.

As yet another embodiment, the video content and/or cues may be edited to reflect the win/loss status of tickets sold. That is, because the wagering is likely to be closed before the video content is displayed, the keno game establishment 130 has knowledge of what tickets have been sold and what potential pay events players have selected. Thus, when a drawn pay event matches a selected pay event, a cue could be inserted into the video content by the keno game establishment 130 that is specific to the tickets sold and/or highlights the winning or losing status of a ticket. For example if no one picked the death of a marine potential pay event, but the death of a marine occurs and is a drawn pay event, the cue could state "No one picked this pay event! Shame on you!" or some other admonitory phrase. Likewise, if a ticket has a particularly high payout, then the cue might say "Ticket 13487 has just matched seven of eight spots! Congratulations!" The cue could also state whether there were multiple winners on a particular drawn pay event, the cumulative winning tickets, or cumulative benefit that will be provided amongst all ticket holders. If the ticket was purchased in such a manner as to identify the player to the keno game establishment, the cue could be more personalized. "John Smith, you just matched ten pay events! Congratulations!" Instead of a player name, a player number or player screen name could also be used. The cue could also be more prospectively positive based on a player missing the drawn pay events. For example, "Joan Smith, you missed the last pay event, and have one more you need to win. Let's see if the Chaplain is present." Other cues with other sorts of promotional, inspirational, or congratulatory information may also be used as needed or desired.

Another way to vary information provided to the players based on keno tickets sold does not necessitate changes to the cues. Rather, the additional information presented to the players is added as part of an additional editing process. Text may be added in such a manner as to overlay the video content on the display. VCRs commonly display tracking information in such an overlay fashion. Thus, the cues are presented as described above, and the information described in the previous paragraph such as congratulatory or admonitory information may be presented through this tertiary information avenue. The tertiary information avenue may be added by a set top box or other device immediately prior to display of the video content or other location as needed or desired.

A permutation of varying the content of the cue is varying the purpose of the cue. For example, as noted above, the cue could alert a particular player or ticket holder that they were a winner. If the cue were a pause in the video content, the pause could be inserted to allow time for players to check their tickets to see if they selected the drawn pay event. Alternatively, a pause could be inserted when a winning ticket has been completed so that the winner could stand up for acknowledgment or to receive some additional benefit. For pauses, the pause could be for a set amount of time or require some interaction to resume play. As one option, the keno attendant could resume play with the press of a button. As another option, if the player is watching the content alone, the player could press a resume button. Instead of a pause, the pay event could repeat itself, perhaps in slow motion, so as to highlight the occurrence of the pay event.

As still another variation of the present invention, the present invention could be implemented on several channels. To play, the player may need to purchase a different keno ticket 140 for each channel, or the keno tickets 140 may be generic enough to operate across multiple instances of video content. The greater the number of channels over which the player desires the keno ticket 140 to operate, the higher the wager the player may have to make. Note that in such a multi-channel embodiment, the pay events may occur simultaneously or at different times on the various channels.

As yet another variation, the video content to be aired at a particular keno game establishment 130 may form the basis of a game of chance in and of itself. The players could bid on which video content from amongst various channels and/or episodes is played on a particular monitor, with the highest bid paying the keno game establishment 130 the winning bid and the video content being presented. Alternatively a more democratic vote system could be used, with the losers receiving a consolation benefit (or not). This selection variation could have differing levels of granularity including the genre, the series, or the particular episode of video content. Players may also vote in interactive movies such as choosing from amongst available video on demand and/or choose your own adventure style movies.

As still another variation, the drawn pay events may be selected based on the keno tickets sold. As noted above, because the wagering may stop before the presentation of the video content, the keno game establishment 130 knows a priori on which potential pay events wagers have been made. Based on expected payout, the drawn pay events may be selected. Much like in horseracing, odds may be posted as wagers are made to help inform the players of the nature of the wager. Note that in such embodiments, if two players have "jackpot" style winning tickets, they may have to share the jackpot. Note further, that this jackpot or prize winning sharing concept could be extended to other embodiments of the present invention.

As still another variation, the odds of a particular pay event occurring may be varied or have differing benefits associated therewith. For example, McQueen only utters his quip about the Commodore's mother once in the entire series. Thus, the likelihood of this being a drawn pay event is small. To reflect the slim chance of it being drawn, it may have an increased or bonus reward associated with it. Alternatively, some potential pay events may occur multiple times in the same video content. For example, there are several episodes where multiple marines die. If a keno player selects "Marine dies" as a selected pay event from amongst the potential pay events, and the marine dies pay event is a drawn pay event multiple times, then the benefit for that selection may be increased or varied. For example, a multiplier could be applied to a payout.

Another variation in the present invention is where the video content is stored. While the various embodiments propose various locations, the following provides a brief summary of the most likely storage locations. It should be appreciated that other locations are possible and within the scope of the present invention. The video content may be stored with the keno authority 70, either in its own storage facility or in a video server 224 that directly transmits video content to the various keno monitors 250 (or other displays). This allows centralized control of the video content and makes it easy to add, update, or change the video content. This arrangement also allows the video monitors to be less complex (because they do not have to have storage capacity) and thus less expensive. Alternatively, the video content can be stored in the keno monitors (including set top boxes for converted keno terminals like the hotel television). Each set top box may include a disc changer (e.g., a 100 disc changer) or hard drive with the video content stored thereon. This arrangement causes the set top box and keno monitors 250 to be more expensive, but may make sense where the keno terminal/set top box only plays a limited selection of movies (e.g., one movie per terminal) and has dedicated advertising for this limited selection. As yet a third alternative, the video content may be stored on a portable medium such as a DVD. The player may obtain the DVD and/or player from a keno register or standard location, and take the DVD to the keno monitor 250 or other DVD player. Another example would be a keno attendant/bartender obtaining the DVD from the keno authority 70 and plays the DVD at a certain time on the keno monitor 250 of the keno game establishment 130. The storage medium may be stored in a conventional or proprietary format so that it can only be played in certain locales if desired or required by law.

While automatic video editing has been discussed above, there are a few other permutations on the concept that are provided here. Automatic video editing may be particularly useful for embodiments in which video content is replayed and the drawn pay events are selected randomly immediately prior to or during playback. Likewise, automatic editing is useful in editing live feeds. The automatic editing may be in the video server 224, the controller at the keno authority 70, the step top box, the keno terminal 200, or in some intermediate location as needed or desired. Note that automatic editing can occur on video content that has been stored in memory of the editing device before editing commences or the editing may take place on video content that is being received over a communication network (e.g., terrestrial broadcast television, satellite television feed, cable television feed, streaming video from the internet, or the like). The editing process may add a small delay as the editing occurs. However, a delay of approximately ten seconds is contemplated and acceptable for most applications. While ten seconds is specifically contemplated, other delays of longer or shorter delays are also within the scope of the present invention.

The automatic editing may automatically determine drawn pay events and insert an appropriate cue based on the video content directly or based on a set of potential pay events that have already been designated (such as by a tag) for the video content. In this case, the editor may perform a random selection of a subset of the set of potential pay events.

To create the set of potential pay events, it should be appreciated that the set of potential pay events will likely be much larger than the set of drawn pay events marked with cues on which an outcome of a keno game is based. The larger set of potential pay events allows different sets of pay drawn pay events to be used in different presentations of the video content. The set of potential pay events may be created each time new video content is added to the video content storage location. Again, the creation of the set may be automatic or manual. During receipt of live video content, a person similar to a closed-caption stenographer, sports statistician, or the like may tag potential pay events or input information useful for tagging potential pay events. This person may be on the video creation side before broadcast or on the receiving side and still be within the scope of the present invention. Alternatively, players or other people may indicate prospective potential pay events. These people may be paid individuals using a technique known as digital piecework and as exemplified by U.S. Pat. No. 6,093,026, which is hereby incorporated by reference in its entirety, or may be volunteers. Pay may be in the form of free play, comps, cash, or the like as needed or desired. As yet another alternative, and as described above in the originally disclosed embodiment, the tags that mark potential pay events may be stored with the original video content. Alternatively, the list of tags may be in a separate file having timestamps and associated cue descriptions.

The randomness of the drawing of pay events may be effectuated in a number of different ways. For example, all potential pay events within the set of potential pay events may be equally likely. This embodiment works best if there is only one potential pay event associated with each descriptor. That is “Marine dies” is a bad option for the example series since marines tend to die in batches during the series. A better option would be characters uttering unique lines of dialog as each one will only occur once during each presentation of video content. This embodiment is simple in that the players do not need to have the odds explained to them. Alternatively, certain potential pay events may have a greater or lesser likelihood of being drawn than others. As noted above, these pay events may have changed benefits associated with them based on their likelihood. This embodiment adds complexity to the game. Complexity in and of itself is neither good nor bad, but it may affect the nature of the players attracted to the game. Still another method of creating randomness is to vary the number of pay events that are drawn from the set of potential pay events. This determination may be made at the keno authority 70, the set top box, the keno terminal, or other location as needed or desired. As yet another alternative, the drawings of the pay events may not be random. Rather, the drawing may move through the set of potential pay events in round-robin fashion to ensure that all potential pay events occur on a regular basis. However, this embodiment has implications in terms of potential player abuse. To avert this issue, the tickets may need to be generated randomly.

While the discussion above contemplates that the cues will be edited directly into the video content, other arrangements are possible. The cues may be stored in separate video files in conjunction with the video content. Again, the storage can be at any of the previously recited locations. As yet another alternative, the cues may be generated as needed by the editor for on the fly editing. This embodiment is particularly useful when other parameters are being inserted into the cues. That is, the content of the cues may be changed dynamically to indicate the winnings of particular players as drawn pay events happen or other circumstances require.

In several locations of the current disclosure, the disclosure mentions a set top box being a possible implementation option. To summarize what is intended by those discussions, a set top box may be an electronic device that outputs video content to a display. The set top box may be integrated into a keno terminal, integrated into a keno monitor, or other device, but usually will be a peripheral device that may allow a conventional display to be adapted for use in the video based keno game of the present invention. Set top boxes according to the present invention may also be embodied in cable television receivers, satellite television receivers, digital video recorder devices (such as TIVO®), video game consoles, and the like. Alternate examples are specialized VCR or DVD players that take edited video clips and present the edited video content with cues to the playback device. In most examples, these devices are adapted to receive the video content from a remote location, but in the latter two examples, the specialized media discussed above may be utilized.

In some embodiments, the set top box may insert the cues and/or tertiary information channel into the video content. The cues and/or tertiary information may be generated by the set top box or may be received from a remote location with or without out the video content (such as in a second channel) and then inserted by the set top box. The cues may be inserted based on tags if such are present in the video content.

With respect to from where the tags come, the set top box may receive the tags from various sources. In a first embodiment, the set top box may receive the tags along with the video content from the same communication network. In a second embodiment, the tags may be transmitted to the set top box in a communication network different from the one in which the video content is transmitted. As yet another embodiment, the tags may be generated internally by an editor within the set top box. The set top box may receive the tags prior to the start of video playback or during video playback. As alluded to above, the transmission of the video content and/or tags may be secured to prevent interception and use by players or insertion of fraudulent tags by players. One solution is to authenticate the transmission of tags and the video content with a cryptographic hash such as MD5 or SHA-1 hash functions. Alternatively, the entire transmission may be encrypted, albeit at the expense of requiring more decryption computing power at the receiving set top boxes.

Some delay may be generated during authentication or decryption without departing from the scope of the present invention.

Numerous examples of selling the keno ticket have been presented, a summary of these is provided here. The sold keno ticket can be secured by the player from a cash register adapted to dispense such, a vending machine (the self-serve keno terminal 274), a keno terminal 200, a set-top box (such as in the player's hotel room), the portable keno terminal, the mobile terminal 300, and the like. The player must pay for the wager associated with the keno ticket. This payment may be made by providing consideration such as cash, chips, tokens, comp points, alternate currency, a payment identifier (credit card number, debit card number, financial account number, hotel room number, cell phone/mobile terminal account number), smart card or the like as needed or desired. Alternatively, as noted above, the keno ticket may be provided as some form of compensation to the player or otherwise provided for free as a comp or promotion if needed or desired.

At several locations, the disclosure has indicated that the keno sales location (such as keno terminal 200) may randomly select pay events for the keno player. There are several permutations for this activity. The controller of the keno sales location may randomly select the pay events locally. The controller of the keno authority 70 may randomly select the pay events and transmit the selected pay events to the keno sales location for printing onto the keno ticket. Alternatively, the controller of the keno authority 70 may transmit a list of a set or subset of the potential pay events to the keno sales location and the keno sales location randomly selects the pay events and prints them on the sold keno ticket. As yet another embodiment, the controller transmits a random subset of the list of potential pay events to the keno sales location, and the player selects from this random subset.

Several electronic keno tickets have been discussed, such as those at self-serve combination keno terminals 274, the mobile terminal 300, the set top boxes, the IPOD, and the like, but it should be appreciated that such electronic tickets may also be written to a computer readable medium such as a USB flash drive, a compact disc, or the like. Still further, the keno ticket could be or come with an inexpensive dongle/fob that makes sounds, lights up, or otherwise generates an alarm when a pay event occurs or the player wins. This embodiment would require an output device such as a speaker or LED and an RFID transponder. The transponder could power the output from the energy of an RFID interrogator or have a battery associated with the device. Each transponder could have a unique frequency and the keno game establishment 130 could transmit only on the frequencies of the winning tickets, or the devices could be addressable and a processor in the device read addresses from the interrogator before deciding to generate the alert if appropriate. Alternatively, much like restaurants generate alarms for waiting patrons with a paging system, a similar paging system could be used for the present invention. Still another technique would be to program a processor in the device to go off at certain times when drawn pay events are known to occur during the presentation of the video content. As yet another option, the device could have a microphone that listens for audio cues (whether these are cues for pay events or not) in the video content and processes the same so as to generate the alert. This last embodiment is relatively processor intensive and less likely to be available inexpensively, but it remains an option.

While several methods are discussed above for determining if the player has a winning ticket, a few more options are available in terms of that determination or ways benefits could be provided. Keno tickets according to the present invention could be of the "play and stray" variety, where so long as appropriate identifying information about which video content was the basis of the wager is provided, the keno ticket may be valid for a predefined period of time (such as a year), and the player merely presents the ticket to a keno attendant/keno terminal at a later time to ascertain if it is a winning ticket. Alternatively, a phone line, website or the like could be provided similar to current state lottery postings. The player could be prompted by an interactive voice recognition unit to enter a game ticket identifier, which would be matched in a database against known winning tickets to ascertain whether the player had a winning ticket. Even if the player does not have enough matches to win conventionally, certain pay events may be instant winners. For example, where a consumer product placed within the video content serves as a potential pay event on which the player has made a wager, the presence of the consumer product may instantly turn the ticket into a coupon redeemable towards the purchase of that product. Credits and rebates could be substituted for coupons if needed or desired. Pay events may have multiplying effects. For example, if a drawn pay event occurs between the first and second commercial break, the drawn pay event doubles the benefit, but if the drawn pay event occurs at some other time, it may have a different, lower multiplier. Note that this could be expanded into whether the drawn pay event is a drawn pay event at all. For example, the player may wager that the potential pay event occurs between the first and second commercial breaks, but if the potential pay event occurs after the second break, then the player's selection is a losing selection. Likewise, the potential pay events may be specific to consumer products or the like. The player may have to choose between the following two potential pay events: character drinks a COKE® or character drinks a PEPSI®. Depending on which one on which the wager is made and the video content, the player may be a winner. Note that this could be combined with the previous couponing embodiment such that if a player wagers on COKE®, but loses, then the ticket turns into a coupon subsidized by COCA COLA as compensation for betting on COKE®.

Benefits can also be varied by timing factors. For example, the player may have a decaying benefit. That is, if the player redeems the winning ticket quickly, the benefit is larger. This promotes the player immediately realizing the value of the game (and hopefully playing again) or having more money to spend in the casino. The player may also get a benefit enhancer for purchasing a ticket early or a benefit reduction for delayed purchase of the ticket. For example, tickets may be able to be purchased after the start of the video content, but the prize prorated based on how much of the video has been presented.

Particularly contemplated aspects of the present invention are disclosed herein. One aspect of the present invention is a method comprising preparing video content for use in a keno game by associating a cue with a potential pay event in the video content, wherein the cue is adapted to inform a keno player that the potential pay event is a drawn pay event. This method is expanded by packaging the video content in a manner suitable for distribution to a keno game establishment, keno authority, or the like. This method is expanded by delivering the video content to a keno game establishment, a manufacturer of keno game terminals, a keno authority, or the like. This method is expanded by associating a tag with the potential pay event and associating the cue with the tag. The tag may store information in an auxiliary channel associated with playback of the video content such as the vertical blanking interval of the video content. The cue may be an audible cue such that the keno player hears that the pay event has occurred when the video content is played to keno player. The cue may be a visual cue such that the keno player sees that the pay event has occurred when the video content is played to the keno player. The method is expanded by identifying potential pay events within the video content, such as by receiving from a third party an indication of potential pay events within the video content. The third party may be the creator of the video content.

Another aspect of the present invention is a video clip comprising a cue associated with a potential pay event in the video clip, wherein the cue designates the potential pay event as a drawn pay event to a keno player when the video clip is displayed in conjunction with a keno game. The video clip is adapted for delivery to a keno game establishment, a keno authority, a manufacturer of keno game terminals, and the like. The video clip may include a tag that is adapted to trigger the cue when the video clip is played. The tag may be stored in the vertical blanking interval of video content. The cue for the video clip may be an audible or visual cue.

Another aspect of the present invention is a keno terminal adapted to process keno tickets comprising an input/output element adapted to manipulate a keno ticket for processing and a controller adapted to process indicia on the keno ticket, wherein the indicia is indicative of a pay event potentially occurring in associated video content of a video based keno game. The input/output may be adapted to print the keno ticket such that the keno ticket displays the indicia indicative of the pay event potentially occurring in the associated video content of the video based keno game. The input/output may be adapted to receive from a keno player the keno ticket with keno player generated markings thereon selecting certain pay events. The keno terminal may further comprise a printer adapted to print a keno receipt reflecting pay event choices made by the keno player for an upcoming video based keno game. The input/output may be adapted to receive from a keno player the keno ticket with indicia thereon and the controller processes the indicia to determine if the potentially occurring pay event occurred in the associated video content. The keno terminal may further comprise a prize dispenser adapted to authorize the provision of a prize to the keno player if the controller determines that the potentially occurring pay event occurred in the associated video content.

Another aspect of the present invention is a keno terminal comprising a display adapted to present to a keno player video content having drawn pay events marked with a cue; an input adapted to accept input from the keno player; and a controller adapted to conduct a keno game on the keno terminal. The input may be adapted to accept input from the keno player selecting pay events from amongst a set of potential pay events associated with the video content. The input may be adapted to accept wager information from the keno player. The keno terminal may comprise an output adapted to authorize provision of a benefit to the player. The controller may randomly select pay events from potential pay events for the keno player.

Another aspect of the present invention is a keno ticket comprising indicia indicative of a potential pay event in a video based keno game. The indicia may comprise text describing the potential pay event. The text may be an identifier. The indicia may comprise a number associated with the potential pay event. The keno ticket may comprise a scratch off coating or be formed from an adhesive element. The keno ticket may be adapted to be presented on an electronic display.

Another aspect of the present invention is a method of conducting a keno game comprising conducting the keno game by displaying video content with cues designating drawn pay events associated therewith; and presenting the cues to a player of the keno game to alert the player that a pay event has occurred. The method may be expanded by selling tickets for the keno game. The method may be expanded by letting the player select pay events from a set of potential pay events. The method may be expanded by randomly selecting pay events from a set of potential pay events. The cues may be presented audibly or visually. The method may be expanded by associating a different number with each of the pay events. The method may be expanded by randomly selecting numbers to associate the different number with each of the pay events. The method may be expanded by randomly selecting pay events from a set of predetermined potential pay events associated with the video content such that selected pay events determine if the player is a winner. The method may be expanded by receiving a ticket from the player after the keno game has completed and determining if the ticket has indicia relating to presented cues of the video content. The method may be expanded by providing an award for a winning ticket received from the player. The method may be expanded by accounting with a third party for keno ticket sales. The method may be expanded by accounting with a third party for keno ticket winnings.

Another aspect of the present invention is a system for conducting a keno game comprising a display adapted to present video content to keno players; and video content suitable for presentation on the display and having one or more pay events contained therein and designated by corresponding cues, wherein the pay events are adapted to be presented to the keno players during playback of the video content such that particular pay events being present in the video content controls how winning tickets are determined.

Rules of Interpretation

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this patent application) nor the Abstract (set forth at the end of this patent application) is to be taken as limiting in any way as the scope of the disclosed invention(s).

The term "product" means any machine, manufacture and/or composition of matter as contemplated by 35 U.S.C. §101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to “another embodiment” in describing an embodiment does not imply that the referenced embodiment is mutually exclusive with another embodiment (e.g., an embodiment described before the referenced embodiment), unless expressly specified otherwise.

The terms “including”, “comprising” and variations thereof mean “including but not limited to”, unless expressly specified otherwise.

The terms “a”, “an” and “the” mean “one or more”, unless expressly specified otherwise.

The term “plurality” means “two or more”, unless expressly specified otherwise.

The term “herein” means “in the present application, including anything which may be incorporated by reference”, unless expressly specified otherwise.

The phrase “at least one of”, when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase “based on” does not mean “based only on”, unless expressly specified otherwise. In other words, the phrase “based on” describes both “based only on” and “based at least on”.

The term “whereby” is used herein only to precede a clause or other set of words that express only the intended result, objective or consequence of something that is previously and explicitly recited. Thus, when the term “whereby” is used in a claim, the clause or other words that the term “whereby” modifies do not establish specific further limitations of the claim or otherwise restricts the meaning or scope of the claim.

Where a limitation of a first claim would cover one of a feature as well as more than one of a feature (e.g., a limitation such as “at least one widget” covers one widget as well as more than one widget), and where in a second claim that depends on the first claim, the second claim uses a definite article “the” to refer to the limitation (e.g., “the widget”), this does not imply that the first claim covers only one of the feature, and this does not imply that the second claim covers only one of the feature (e.g., “the widget” can cover both one widget and more than one widget).

Each process (whether called a method, algorithm or otherwise) inherently includes one or more steps, and therefore all references to a “step” or “steps” of a process have an inherent antecedent basis in the mere recitation of the term ‘process’ or a like term. Accordingly, any reference in a claim to a ‘step’ or ‘steps’ of a process has sufficient antecedent basis.

When an ordinal number (such as “first”, “second”, “third” and so on) is used as an adjective before a term, that ordinal number is used (unless expressly specified otherwise) merely to indicate a particular feature, such as to distinguish that particular feature from another feature that is described by the same term or by a similar term. For example, a “first widget” may be so named merely to distinguish it from, e.g., a “second widget”. Thus, the mere usage of the ordinal numbers “first” and “second” before the term “widget” does not indicate any other relationship between the two widgets, and likewise does not indicate any other characteristics of either or both widgets. For example, the mere usage of the ordinal numbers “first” and “second” before the term “widget” (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers “first” and “second” before the term “widget” does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this patent application and the title of this patent application are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software A "processor" means any one or more microprocessors, CPU devices, computing devices, microcontrollers, digital signal processors, or like devices.

The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

Some embodiments can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present disclosure.

What is claimed is:

1. A method of conducting a keno game comprising:

presenting video content to a keno player via a display, the video content having pay events marked with a cue therein, each cue being an indication, displayed via the display, that a respective associated pay event in the video content is an outcome determinative pay event;

selling a keno ticket to the keno player wherein the keno ticket comprises indicia relating to potential pay events in the video content and indicates selected pay events from the potential pay events;

determining that a sufficient number of the selected pay events indicated by the keno ticket correspond to the pay events marked with a cue in the video content;

providing a benefit to the keno player after determining that a sufficient number of the selected pay events correspond to the pay events marked with a cue in the video content; and accounting with a third party based on the keno game, wherein presenting video content to the keno player comprises presenting video content selected from genres consisting of:

situational comedies, sports events, syndicated television shows, music videos, feature films, reality television shows, nature shows, weather shows, casino footage, and educational documentaries.

2. The method of claim 1 wherein selling a keno ticket to the keno player comprises, in response to the keno player requesting a ticket, randomly selecting pay events from the potential pay events of the video content.

3. The method of claim 1 wherein selling a keno ticket to the keno player comprises receiving from the keno player an indication as to which pay events should be selected on the keno ticket from among the potential pay events.

4. The method of claim 1 wherein presenting video content to the keno player comprises presenting video content having static pay events such that the pay events marked with a cue are identical to the potential pay events.

5. The method of claim 1 wherein presenting video content to the keno player comprises presenting video content whose pay events marked with a cue are randomly selected from among the potential pay events.

6. The method of claim 1 wherein the marked with a cue pay events are selected from a group consisting of: explosions, gunfights, arguments, quips, kisses, romantic encounters, character entrances, character departures, secret identity revelations, laugh tracks, product placement, music, and items in background scenery.

7. The method of claim 1 wherein presenting video content to the keno player, the video content having pay events marked with a cue therein comprises presenting a visual cue to the keno player, the visual cue selected from a group consisting of: a pop-up bubble, overlaid text, overlaid graphics, inserted video clips, a pause in the video content, picture-in-picture, a ticker, an added header, an added footer, and an added sidebar.

8. The method of claim 1 wherein presenting video content to a keno player, the video content having pay events marked with a cue therein comprises presenting a cue and an associated number for each pay event to the keno player.

9. The method of claim 8 wherein determining if the selected pay events from the potential pay events correspond to the marked with a cue pay events in the video content comprises determining if the associated number matches a number selected by the keno player for that pay event.

10. The method of claim 1 further comprising presenting a history of recently occurring marked with a cue pay events.

11. The method of claim 10 wherein presenting a history of recently occurring marked with a cue pay events comprises using a ticket to present the history.

12. The method of claim 10 wherein presenting a history of recently occurring marked with a cue pay events comprises using a second display to present the history.

13. The method of claim 1 further comprising announcing a winning keno ticket in conjunction with presenting the video content.

14. The method of claim 1 wherein announcing the winning keno ticket comprises announcing a ticket identifier.

15. The method of claim 1 wherein announcing the winning keno ticket comprises announcing a winning keno player.

16. The method of claim 1 wherein presenting video content to the keno player comprises presenting the video content to the keno player in a casino.

17. The method of claim 1 wherein presenting video content to the keno player comprises presenting the video content to the keno player in a hotel room.

18. The method of claim 1 wherein presenting video content comprises presenting specific video content requested by the keno player.

19. The method of claim 1 wherein presenting video content comprises presenting video content whose marked with a cue pay events are based on specific keno tickets sold.

20. The method of claim 1 wherein presenting video content comprises presenting video content broadcast from a remote location.

21. The method of claim 1 wherein presenting video content comprises presenting locally stored video content.

22. The method of claim 1, wherein the video content having pay events marked with a cue therein comprises video content modified from an original form by adding at least one cue in the video content.

23. The method of claim 1, wherein the video content having pay events marked with a cue therein comprises video content edited by an editor to include at least one cue in the video content.

24. A keno game system comprising:

a display for presenting video content to a keno player, the video content having pay events marked with a cue therein, each cue being an indication, displayed via the display, that a respective associated pay event in the video content is an outcome determinative pay event;

a keno terminal for selling a keno ticket to the keno player wherein the keno ticket comprises indicia relating to potential pay events in the video content and indicates selected pay events from the potential pay events; and a controller adapted to determine that a sufficient number of the selected pay events indicated by the keno ticket correspond to the pay events marked with a cue in the video content; and provide a benefit to the keno player after determining that a sufficient number of the selected pay events correspond to the pay events marked with a cue in the video content, wherein the video content is selected from genres consisting of:

situational comedies, sports events, syndicated television shows, music videos, feature films, reality television shows, nature shows, weather shows, casino footage, and educational documentaries.

25. A computer readable medium comprising software with instructions adapted to:

presenting video content to a keno player via a display, the video content having pay events marked with a cue therein, each cue being an indication, displayed via the display, that a respective associated pay event in the video content is an outcome determinative pay event;

sell a keno ticket to the keno player wherein the keno ticket comprises indicia relating to potential pay events in the video content and indicates selected pay events from the potential pay events;

determining that a sufficient number of the selected pay events indicated by the keno ticket correspond to the pay events marked with a cue in the video content;

providing a benefit to the keno player after determining that a sufficient number of the selected pay events correspond to the pay events marked with a cue in the video content; and account with a third party based on the keno game, wherein presenting video content to the keno player comprises presenting video content selected from genres consisting of:

situational comedies, sports events, syndicated television shows, music videos, feature films, reality television shows, nature shows, weather shows, casino footage, and educational documentaries.

* * * * *